US007607979B2

(12) United States Patent
Satoh

(10) Patent No.: US 7,607,979 B2
(45) Date of Patent: Oct. 27, 2009

(54) DISK, DISPLAYED SYMBOL IDENTIFIER OF MECHANICAL SLOT MACHINE, AND MECHANICAL SLOT MACHINE

(75) Inventor: Masatoshi Satoh, Niiza (JP)

(73) Assignee: Konami Gaming Incorporated, Las Vegas, NV (US)

( * ) Notice: Subject to any disclaimer, the term of this patent is extended or adjusted under 35 U.S.C. 154(b) by 384 days.

(21) Appl. No.: 10/905,762

(22) Filed: Jan. 20, 2005

(65) Prior Publication Data

US 2005/0159210 A1 Jul. 21, 2005

(30) Foreign Application Priority Data

Jan. 20, 2004 (JP) ............................ 2004-012339

(51) Int. Cl.
*A63F 13/00* (2006.01)

(52) U.S. Cl. ............................ 463/20; 463/16; 463/47; 273/143 R

(58) Field of Classification Search ............ 273/143 R; 463/16, 20, 46
See application file for complete search history.

(56) References Cited

U.S. PATENT DOCUMENTS

| | | | | | |
|---|---|---|---|---|---|
| 3,684,290 | A | * | 8/1972 | Wayne | 273/143 C |
| 3,910,582 | A | * | 10/1975 | Richards | 273/143 R |
| 4,138,114 | A | * | 2/1979 | Andersen | 273/143 R |
| 4,262,906 | A | * | 4/1981 | Heywood | 273/143 R |
| 4,421,310 | A | * | 12/1983 | Williams | 273/143 R |
| 5,058,893 | A | * | 10/1991 | Dickinson et al. | 273/143 R |
| 6,003,867 | A | * | 12/1999 | Rodesch et al. | 273/143 R |
| 6,043,483 | A | | 3/2000 | Schreiber | |

FOREIGN PATENT DOCUMENTS

| | | | | |
|---|---|---|---|---|
| EP | 0023136 | A1 | | 1/1981 |
| JP | 06-170032 | A | | 6/1994 |
| JP | 07-301309 | A | | 11/1995 |
| JP | 2001-149523 | A | | 6/2001 |
| JP | 2002-136640 | A | | 5/2002 |
| JP | 2002-162252 | A | | 6/2002 |
| JP | 2002-310609 | A | | 10/2002 |
| JP | 2003-310819 | A | | 11/2003 |
| JP | 2003310819 | A | * | 11/2003 |
| JP | 2005-152126 | A | | 6/2005 |

OTHER PUBLICATIONS

JP 2003-310819 UEDA, machine translation, retrieved Apr. 23, 2008 from http://dossier1.ipdl.inpit.go.jp/cgi-bin/tran_web_cgi_ejje?u=http%3A%2F%2Fdossier1.ipdl.inpit.go.jp%2FAIPN%2Fodse_itm_cntnt.ipdl&N0000=7432&N0001=19 &N0500= 1E_N%2F%3B%3E%3A%3C%3E%3F7%3E6%2F%2F%2F%2F%2F%2F%2F&N0551=011000000110011000&N0550=111111100111111000000&N0560=00000000&tt1=com.*

JP 07-301309 Suzuki, JPO Website Machine Translation, retieved at http://dossier1.ipdl.inpit.go.jp/AIPN/aipn_call_transl.ipdl?N0000=7413&N0120=01&N2001=2&N3001=H07-301309 &Ntt1=computer_v5&Ntt2=electronics_v5&Ntt3=proper_v5 &Ntt4=&Ntt5=&Ntt6=&Ntt7=&Ntt8=&Ntt9=&Ntt10=.*

* cited by examiner

*Primary Examiner*—Ronald Laneau
*Assistant Examiner*—Ross A. Williams
(74) *Attorney, Agent, or Firm*—Global IP Counselors, LLP

(57) ABSTRACT

A disk for identifying individual symbols on a reel displayed in a symbol display region of a mechanical slot machine, the disk being concentric with the rotational axis of the reel and rotatable along with the reel, the disk surface being provided with a plurality of convex members protruding radially around the rotational axis, and the plurality of convex members each having at the top a detection surface whose distance from the rotational axis is within a unique range.

16 Claims, 19 Drawing Sheets

DISK, DISPLAYED SYMBOL IDENTIFIER OF MECHANICAL SLOT MACHINE, AND MECHANICAL SLOT MACHINE

BACKGROUND OF THE INVENTION

1. Field of the Invention

The present invention relates to a disk for ascertaining symbol positions on a reel of a slot machine, to a displayed symbol identifier of a mechanical slot machine, and to a mechanical slot machine.

2. Background Information

In the past, there have been proposals for a slot machine in which symbols displayed in a symbol display region are identified with an optical sensor by giving a distinctive shape to a disk that shares its rotational axis with a reel (see, for example, U.S. Pat. No. 6,043,483).

The apparatus in U.S. Pat. No. 6,043,483 is configured such that there is a disk having a plurality of square notches around its edge, as on a gear, and when this disk rotates, the edge of the disk passes between the light source side of the optical sensor and the reading side, which is across from this light source. When the disk is rotated, light blocking portions that block the light around the edge of the disk, and light transmitting portions that have square notches and transmit light, alternately pass through the optical sensor. The disk is provided with light blocking portions that vary in size in the peripheral direction at a reference location, and the symbol being displayed is identified from the number of passes made by the light blocking portions or light transmitting portions.

There has also been proposals in the past for a reel mechanism that detects the stopping position and the like from the layout of holes made in a disk (see, for example, European Patent Application Publication No. 0023136).

The reel mechanism in European Patent Application Publication No. 0023136 comprises a disk provided with two rows of a plurality of holes in the peripheral direction, and information encoded by the holes is read from the light passing through the holes as the reel rotates.

As in U.S. Pat. No. 6,043,483, there has been a proposal for an apparatus in which a disk is arranged on a rotary shaft, and the symbol displayed in the symbol display region of a slot machine is identified by means of the amount of rotation from a reference position on this disk, out of all the symbols on a reel that has the same rotational axis.

However, with an apparatus such as this, because the symbol currently being displayed is identified from the amount of rotation from a reference position, the disk must have a portion that serves as the reference position, and to detect the rotational position of the disk, this portion must pass through the detector. Therefore, immediately after the power is turned on, the symbol currently being displayed cannot be identified unless the disk is first rotated so that the reference position passes the position of the sensor.

In addition, if the symbol actually being displayed should deviate from the symbol display region due to vibration of the housing, malfunction, or the like, it cannot be detected unless the disk is rotated so that the portion serving as the reference position passes the sensor.

SUMMARY OF THE INVENTION

It is therefore an object of the present invention to provide a disk with which the symbol being displayed can be identified even immediately after the power is turned on or if the position of the symbol has shifted, as well as a displayed symbol identifier of a mechanical slot machine, and a mechanical slot machine.

According to one aspect of the present invention, a disk serves to identify individual symbols on a reel displayed in a symbol display region of a mechanical slot machine, and is concentric with the rotational axis of the reel and rotatable together with the reel. The disk includes a plurality of members arranged on a surface of the disk which extend radially outward from the rotational axis, and a detection surface arranged on each of the plurality of the members. Each detection surface is uniquely spaced from the rotational axis.

Thus, the detection surfaces on the members of the disk according to the present invention are uniquely spaced from the rotational axis. As a result, if each symbol is made to correspond to a detection surface, the unique distance to the distance sensor across from a detection surface can be detected, and the symbol currently being displayed can be identified. In addition, the displayed symbol can be identified immediately after the power has been turned on, without having to rotate the reel.

In addition, since the distance to the distance sensor across from a detection surface is unique to that detection surface, even symbols that are the same can be individually identified by the order in which they are arranged on the reel. Accordingly, when the boundary of each detection surface passes the position across from the distance sensor, the symbol position on the reel can be accurately detected, and the symbol position on the reel can be detected by rotating the reel only slightly.

As a result, the game can begin in less time after the power is turned on. In addition, if deviation from the symbol position initially detected on the reel should occur due to vibration, cheating from the outside, etc., the symbol can be restored to its proper position more quickly. In addition, it takes less time to stop the rotating reel at a predetermined stopping position.

According to another aspect of the present invention, a disk serves to identify individual symbols on a reel displayed in a symbol display region of a mechanical slot machine, and is concentric with the rotational axis of the reel and rotatable together with the reel. The disk includes a plurality of protrusions arranged on a surface of the disk which extend in the thickness direction of the disk, and a detection surface arranged on each of the plurality of protrusions. Each detection surface is uniquely spaced from the rotational axis.

Thus, the detection surfaces on the plurality of protrusions of the disk according to the present invention are each uniquely spaced from the rotational axis. As a result, if each symbol is made to correspond to a detection surface, the unique distance to the distance sensor across from a detection surface can be detected, and the symbol currently being displayed can be identified. In addition, the displayed symbol can be identified immediately after the power has been turned on, without having to rotate the reel.

In addition, since the distance to the distance sensor across from a detection surface is unique to that detection surface, even symbols that are the same can be individually identified by the order in which they are arranged on the reel. Accordingly, when the boundary of each detection surface passes the position across from the distance sensor, the symbol position on the reel can be accurately detected, and the symbol position on the reel can be detected by rotating the reel only slightly.

As a result, the game can begin in less time after the power is turned on. In addition, if deviation from the symbol position initially detected on the reel should occur due to vibration, cheating from the outside, etc., the symbol can be restored to its proper position more quickly. In addition, it takes less time to stop the rotating reel at a predetermined stopping position.

In addition, if the detection surfaces are arranged on the rotational axis side, the detecting component of the distance sensor can be arranged on this rotational axis side so as to be across from the detection surfaces. As a result, the distance sensor can be easily accommodated within the reel even if the sensor is large. Conversely, the reel can be made smaller for a distance sensor of a given size.

According to yet another aspect of the present invention, a disk serves to identify individual symbols on a reel displayed in a symbol display region of a mechanical slot machine, and is concentric with the rotational axis of the reel and rotatable together with the reel. The disk includes a member that extends radially outward from the rotational axis, and detection surfaces arranged on the member. Each detection surface is uniquely spaced from the rotational axis to correspond to the individual symbols.

Thus, the detection surfaces on the member of the disk according to the present invention is uniquely spaced from the rotational axis. As a result, the unique distance to the distance sensor across from the detection surface can be detected, and the symbol currently being displayed can be identified. In addition, the displayed symbol can be identified immediately after the power has been turned on, without having to rotate the reel.

In addition, of the boundaries of the various detection surfaces, when a boundary whose change in distance is unique within the profile for one revolution passes the position across from the distance sensor, the symbol position on the reel can be accurately detected, and the symbol position on the reel can be detected without even one rotation.

According to another aspect of the present invention, a disk serves to identify individual symbols on a reel displayed in a symbol display region of a mechanical slot machine, and is concentric with the rotational axis of the reel and rotatable together with the reel. The disk includes a plurality of protrusions arranged on a surface of the disk which protrude in the thickness direction of the disk, and a detection surface arranged on each of the plurality of protrusions. Each detection surface is uniquely spaced from the rotational axis to correspond to the individual symbols.

Thus, the detection surfaces on the plurality of protrusions of the disk according to the present invention are uniquely spaced from the rotational axis. As a result, the unique distance to the distance sensor across from a detection surface can be detected, and the symbol currently being displayed can be identified. This eliminates the need to provide the disk with a portion that will serve as a reference position. In addition, the displayed symbol can be identified immediately after the power has been turned on, without having to rotate the reel.

In addition, of the boundaries of the various detection surfaces, when a boundary whose change in distance is unique within the profile for one revolution passes the position across from the distance sensor, the symbol position on the reel can be accurately detected, and the symbol position on the reel can be detected without even one rotation.

In addition, if the detection surfaces are arranged on the rotational axis side, the detecting component of the distance sensor can be arranged on this rotational axis side so as to be across from the detection surfaces. As a result, the distance sensor can be easily accommodated within the reel even if the sensor is large. Conversely, the reel can be made smaller for a distance sensor of a given size.

According to yet another aspect of the present invention, a device serves to identify individual symbols on a reel displayed in a symbol display region of a mechanical slot machine, and is disposed around the rotational axis of the reel and rotatable together with the reel. The device includes a plurality of members extending radially outward from the rotational axis, and a detection surface arranged on each of the plurality of members. Each detection surface is uniquely spaced from the rotational axis to correspond to the individual symbols.

Thus, each of the detection surfaces on the device according to the present invention uniquely spaced from the rotational axis. As a result, if each symbol is made to correspond to a detection surface, the unique distance to the distance sensor across from a detection surface can be detected, and the symbol currently being displayed can be identified. In addition, the displayed symbol can be identified immediately after the power has been turned on, without having to rotate the reel.

In addition, since the distance to the distance sensor across from a detection surface is unique to that detection surface, even symbols that are the same can be individually identified by the order in which they are arranged on the reel. Accordingly, when the boundary of each detection surface passes the position across from the distance sensor, the symbol position on the reel can be accurately detected, and the symbol position on the reel can be detected by rotating the reel only slightly.

As a result, the game can begin in less time after the power is turned on. In addition, if deviation from the symbol position initially detected on the reel should occur due to vibration, cheating from the outside, etc., the symbol can be restored to its proper position more quickly. In addition, it takes less time to stop the rotating reel at a predetermined stopping position.

According to yet another aspect of the present invention, a device serves to identify individual symbols on a reel displayed in a symbol display region of a mechanical slot machine, and is disposed around the rotational axis of the reel and rotatable together with the reel. The device includes a member that extends radially outward from the rotational axis, and detection surfaces arranged on the member. Each detection surface is uniquely spaced from the rotational axis to correspond to the individual symbols.

Thus, each of the detection surfaces on the device according to the present invention s uniquely spaced from the rotational axis. As a result, the unique distance to the distance sensor across from the detection surface can be detected, and the symbol currently being displayed can be identified. In addition, the displayed symbol can be identified immediately after the power has been turned on, without having to rotate the reel.

In addition, of the boundaries of the various detection surfaces, when a boundary whose change in distance is unique within the profile for one revolution passes the position across from the distance sensor, the symbol position on the reel can be accurately detected, and the symbol position on the reel can be detected without even one rotation.

According to another aspect of the present invention, the disk surface further comprises stoppers that allow the protrusions to be attached to the disk surface or be detached therefrom.

As a result, the profile of the detection surfaces can be simply modified merely by attaching or detaching the protrusions to or from the disk surface, without having to replace the disk itself. For instance, when the reel strip is modified and the number of symbols is increased or decreased, the detection surfaces corresponding to this increase or decrease in the number of symbols can be simply created merely by attaching or detaching the protrusions to or from the disk surface.

According to yet another aspect of the present invention, the detection surfaces are formed in a serrated shape.

As a result, even if the player should move the reel slightly by cheating after a specific symbol that is to be displayed has in fact been displayed, any deviation produced by this cheating can be easily detected. Furthermore, since even a minute deviation will result in a significant difference in the distance from the detection surface to the rotational axis between the peaks and valleys of the serrations, such deviation can be detected with ease.

According to yet another aspect of the present invention, the center of each detection surface is uniquely spaced from the rotational axis.

As a result, if each symbol is made to correspond to a detection surface, it can be determined whether or not the center of a displayed symbol has stopped in the middle region of the symbol display region. In addition, when a rotating reel is being stopped, the center of the symbol can be stopped in the middle region of the symbol display region by detecting the distance unique to the center part of that detection surface.

According to yet another aspect of the present invention, a hole or notch is formed in the disk at each location corresponding to the center of a symbol in order to ascertain whether or not the center of the symbol is in the middle of the symbol display region.

As a result, it can be determined whether or not the center of a displayed symbol has stopped in the middle region of the symbol display region. In addition, when a rotating reel is being stopped, the center of the symbol can be stopped in the middle region of the symbol display region by detecting the hole or notch in the disk.

According to yet another aspect of the present invention, each detection surface has a shape that gradually moves toward or away from the rotational axis.

As a result, a symbol position on the reel can be detected by putting the distance from the rotational axis to the detection surface in a one-to-one correspondence with the symbol position on the reel, and detecting the distance to the detection surface with the distance sensor across from that detection surface. This means that the disk does not need a reference position, and the current symbol position can be detected as soon as the power is turned on, without having to rotate the reel.

In addition, even if the player should move the reel slightly by cheating after a specific symbol that is to be displayed has in fact been displayed, any deviation produced by this cheating can be easily detected. Furthermore, even a minute deviation can be detected quantitatively, allowing the deviation to be remedied.

According to yet another aspect of the present invention, the center of gravity of the disk projected onto a plane perpendicular to the rotational axis coincides with the position of the rotational axis.

As a result, there is better balance in the weight of the disk with respect to the rotational axis, and the rotation of the reel can be stabilized.

According to yet another aspect of the present invention, a displayed symbol identifier of a mechanical slot machine serves to successively identify individual symbols on a reel displayed in the symbol display region, and includes the following:

one of the disks described above;

a distance sensor for successively detecting the distance to the detection surfaces of the disk;

a memory for storing first data in which the unique distance range for each detection surface has been made to correspond to an individual symbol; and a symbol identifier for identifying corresponding symbols by comparing the distances from the detection surfaces to the distance sensor detected by the distance sensor with the first data.

Thus, the displayed symbol identifier of a mechanical slot machine pertaining to the present invention comprises a disk, a distance sensor, a memory, and a symbol identifier. As a result, the symbol being displayed can be identified by detecting the unique distance from a detection surface to the distance sensor and comparing this distance with first data that has been made to correspond to the various symbols.

According to yet another aspect of the present invention, a displayed symbol identifier of a mechanical slot machine serves to successively identify individual symbols on a reel displayed in the symbol display region, and includes the following:

one of the disks described above;

a distance sensor for successively detecting the distance to the detection surfaces of the disk;

a memory for storing first data in which the unique distance range for each detection surface has been made to correspond to an individual symbol, and second data that lists unique ranges for the centers;

a symbol identifier for identifying corresponding symbols by comparing the distances from the detection surfaces to the distance sensor detected by the distance sensor with the first data; and a center determination unit for determining whether or not the center of a symbol is in the middle region of the symbol display region by comparing a distance from the detection surface to the distance sensor detected by the distance sensor with the second data.

Thus, the displayed symbol identifier of a mechanical slot machine pertaining to the present invention comprises a disk, a distance sensor, a memory, a symbol identifier, and a center determination component. As a result, the unique distance from a detection surface to the distance sensor is detected and compared with first data that has been made to correspond to the individual symbols, so that the displayed symbol can identified, and whether or not the center of the displayed symbol is in the middle region of the symbol display region can be determined by comparison with second data.

According to yet another aspect of the present invention, a displayed symbol identifier of a mechanical slot machine serves to successively identifying individual symbols on a reel displayed in the symbol display region, and includes the following:

one of the disks described above;

a distance sensor for successively detecting the distance to the detection surfaces of the disk;

a memory for storing first data in which the distances from the detection surfaces to the distance sensor have been made to correspond to the individual symbols;

a symbol identifier for identifying corresponding symbols by comparing the distances from the detection surfaces to the distance sensor detected by the distance sensor with the first data;

a sensor for successively detecting the hole or notch provided in the disk; and a center determination unit for determining whether or not the center of a symbol is in the middle region of the symbol display region by detection of the hole or notch.

Thus, the displayed symbol identifier of a mechanical slot machine pertaining to the present invention comprises a disk, a distance sensor, a memory, a symbol identifier, and a center determination component. As a result, the unique distance from a detection surface to the distance sensor is detected and compared with first data that has been made to correspond to the individual symbols so that the displayed symbol can identified, and whether or not the center of the displayed symbol is in the middle region of the symbol display region can be determined.

According to yet another aspect of the present invention, the sensor of the displayed symbol identifier of a mechanical slot machine is an optical sensor or magnetic sensor capable of identifying light or magnetism that passes through the hole or notch.

As a result, it can be determined very precisely whether or not the center of the displayed symbol is in the middle region of the symbol display region.

According to yet another aspect of the present invention, the distance sensor of the displayed symbol identifier of a mechanical slot machine detects distances ultrasonically or electromagnetically.

As a result, even minute differences in distance above each detection surface can be detected with high precision.

According to yet another aspect of the present invention, a mechanical slot machine includes one of the displayed symbol identifiers described above.

As a result, the displayed symbol can be identified by detecting the unique distance from a detection surface to the distance sensor, and comparing with first data that has been made to correspond to the individual symbols.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

The best mode for carrying out the invention will now be described through reference to the drawings.

Embodiment 1

Figure 1:
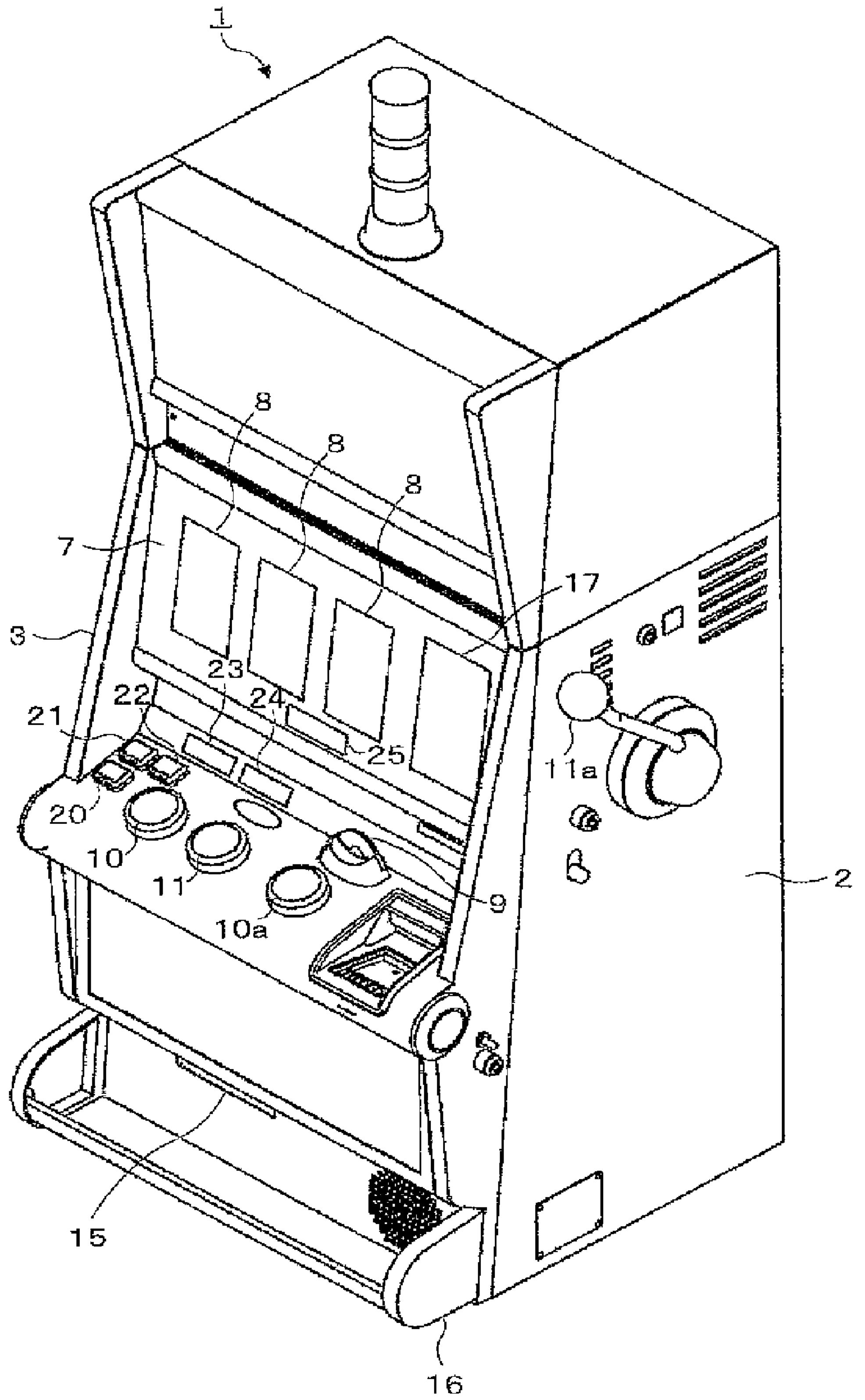
FIG. 1 is an oblique view of the mechanical slot machine according to Embodiment 1.

FIG. 1 is an oblique view of a mechanical slot machine according to the present invention. In FIG. 1, a mechanical slot machine 1 comprises a housing 2 and a front panel 3 that is attached to the front of the housing 2 so as to be capable of opening and closing. A symbol display component 7 that displays three rows of symbols, for example, is provided in back of the front panel 3.

For example, the symbol display component 7 has three symbol display regions 8 in which reels are used to give a fluctuating or stationary display of symbols in the row direction (the up and down direction of the gaming machine). The various symbols can be displayed in fluctuating or stationary mode by each reel.

A coin insertion slot 9 is provided at the front of the housing 2. If there is a game value, what is inserted is not limited to coins, and may be coins, cards, or the like. A spin button 11 is pressed to start the rotating display (fluctuating display) of the symbol display component 7. A spin lever 11*a* has the same function.

The game involved with this mechanical slot machine 1 is begun when a player places a bet and specifies a valid winning line. The winning line can be set in a number of ways, such as the middle horizontal line, the upper or lower horizontal line, or a diagonal line. The bet is placed by inserting a coin into the coin insertion slot 9 (discussed below), or by betting accumulated coins with a bet button 10. When a max bet button 10*a* is pressed, the maximum number of coins that can be bet are bet. A bet can also be placed by a combination of these methods.

When the player specifies a winning line by placing a bet, and then presses the spin button 11, the symbol display component 7 displays symbols in a fluctuating display. Once a predetermined length of time has elapsed, the symbol display component 7 successively displays the symbols that are in fluctuating display into stationary display. The symbols are stopped at specific time intervals one by one, starting on the left as viewed facing the symbol display component 7, for example. If a specific combination of symbols appears on any of the winning lines once the symbols have stopped, a prize is awarded corresponding to that combination of symbols.

A coin payout opening 15 and a coin tray 16 are provided under the front panel 3, and a play direction display 17 that is actuated for the direction of the game is provided above the front panel 3. The play direction display 17 consists of an LCD (liquid crystal display) or any of various kinds of lamp, for example. A speaker is arranged on the mechanical slot machine 1, and generates voice instructions, music, sound effects, and so forth.

The bet button 10 is pressed to use a specific number of the coins accumulated (credited) in a coin accumulator (not shown), and the max bet button 10*a* is pressed to use the maximum specified number of coins accumulated in a coin accumulator (not shown). A payback button 20 pays back all the accumulated coins. A change button 21 is pressed to light a lamp at the top of the mechanical slot machine 1 and notify an attendant that change is desired. A help button 22 has the function of displaying game instructions, dividends, and so forth on a play direction display 17. A payout display 23 displays the number of coins paid out and so forth. An accumulated coin count display 24 displays the number of coins accumulated in the coin accumulator (not shown). A denomination display 25 shows the minimum unit that can be bet with the mechanical slot machine. For instance, this denomination display indicates that the slot machine is a 25-cent machine or a dollar machine. The payout display 23, the accumulated coin count display 24, and the denomination display 25 are made up of LEDs, for example. A locking device unlocks the door depending on the direction it is turned. Labels are applied to part of the housing 2, and indicate the model of the mechanical slot machine 1, the manufacturer's name, and other such information.

Figure 2:
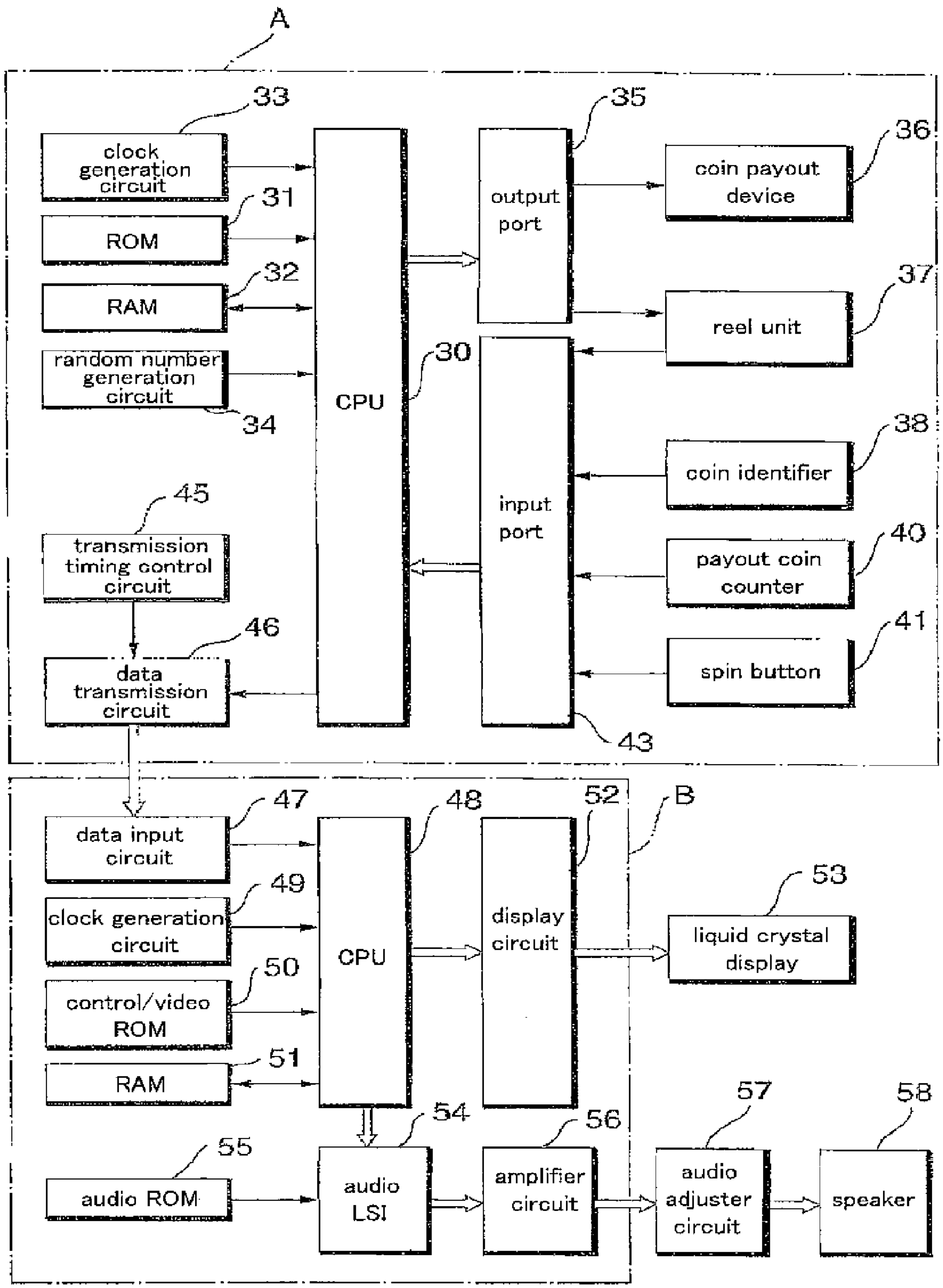
FIG. 2 is a diagram of the electrical configuration of the mechanical slot machine according to Embodiment 1.

FIG. 2 is a diagram of the electrical configuration of the mechanical slot machine of Embodiment 1. As shown in FIG. 2, electrically, the mechanical slot machine 1 comprises a main board A and a sub-board B. On the main board A, a CPU 30 comprises a ROM 31 and a RAM 32, and performs control operations according to a preset program. The ROM 31 stores the control program for controlling the operation of the mechanical slot machine 1, as well as a prize group drawing table used for advance determination (internal drawing) of prize groups, etc.

The CPU 30 is connected to a clock generation circuit 33 that generates reference clock pulses, and a random number generation circuit 34 for generating specific random numbers. The CPU 30, the ROM 31, the RAM 32, and the random number generation circuit 34 form a drawing device. The control signals sent out from the CPU 30 are outputted to a coin payout device 36 that performs coin payout, and a reel unit controller 80 that controls the reels units of the symbol display component 7. The symbol display component 7 and the reel units 37 form a display component.

Signals outputted from a coin identifier 38 that identifies whether or not coins are genuine, a payout coin counter 40 that counts the number of coins paid out, and a spin button 41 that initiates the rotation of the reels are inputted to the CPU 30 through an input port 43. Signals outputted from the CPU 30 are subjected to control by a transmission timing control circuit 45 that controls the timing of signal transmission to the sub-board B, and outputted to the sub-board B through a data transmission circuit 46.

At the sub-board B, signals outputted from the data transmission circuit 46 are inputted to a data input circuit 47. The signals inputted to the data input circuit 47 are processed by a CPU 48. The CPU 48 is connected to a clock generation circuit 49 that generates reference clock pulses, a ROM 50 in which are recorded various programs and image data, and a RAM 51. Data related to video is outputted from the CPU 48 to a liquid crystal display 53 through a display circuit 52 that performs video processing and the like. The liquid crystal display 53 displays letters, stationary pictures, moving pictures, and so forth. Data related to audio is outputted from the CPU 48 to an amplifier circuit 56 through an audio LSI chip 54 that performs sound processing and the like. The audio LSI chip 54 extracts the necessary audio data from an audio ROM 55 and performs processing of audio data. The audio data that has undergone processing for amplification, etc., in the amplifier circuit 56 is outputted to a speaker 58 through an audio adjuster circuit 57 that adjusts the sound.

Figure 3:
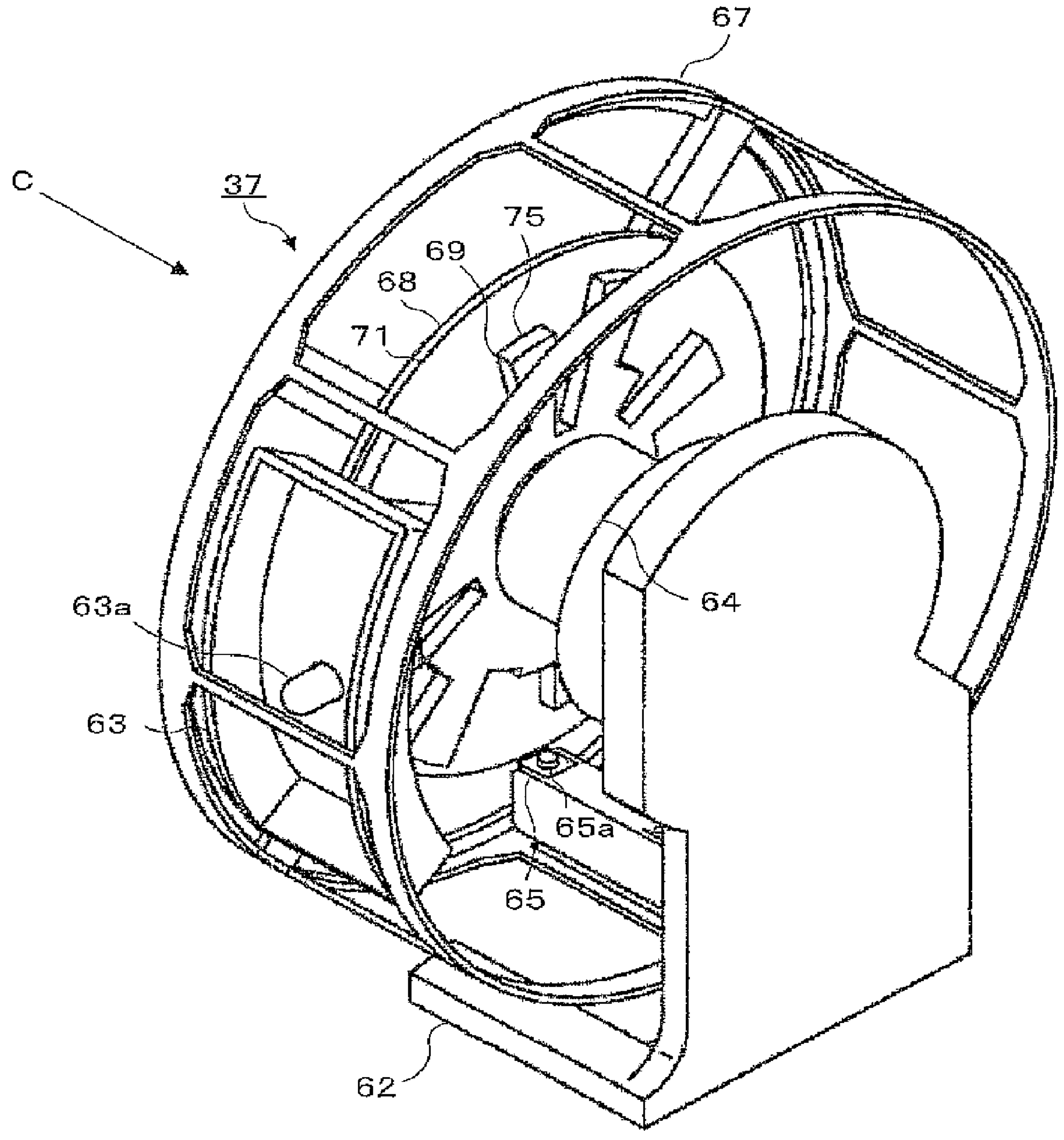
FIG. 3 is an oblique view of a reel unit of the mechanical slot machine according to Embodiment 1.

FIG. 3 is an oblique view of a reel unit 37 of the mechanical slot machine according to Embodiment 1. When the symbol display component 7 consists of three symbol display regions 8, for example, there is a reel unit 37 for each of the symbol display regions 8, and each can be independently controlled for rotation, stoppage, and so forth. The reel unit 37 is formed as follows. First, a lamp holder 63, a motor 64, and a distance sensor 65 are fixed to a reel body 62.

The motor 64 is a stepping motor here, but does not have to be a stepping motor, and may be a DC motor instead. The distance sensor 65 faces a detecting component 65*a* in the rotational axial direction.

Lamps 63*a* are fixed to the lamp holder 63, and a shaft that shares its rotational axis with a reel 67 is arranged on the motor 64. The "rotational axis" indicates the straight line that is the central axis of rotation. The reel 67 and a disk 68 are fixed to this shaft. A plurality of convex members 69 that protrude radially around the rotational axis are arranged on the disk surface 71 of the disk 68. The "disk surface" is a plane substantially perpendicular to the thickness direction of the disk. The convex members 69 each have at the top a detection surface 75 whose distance from the rotational axis is within a unique range.

As a result, the unique distance to the distance sensor 65 across from a detection surface 75*a* at a specific position can be detected, and the symbol currently being displayed can be identified. In addition, the displayed symbol can be identified immediately after the power has been turned on, without having to rotate the reel 67.

In addition, since the distance to the distance sensor 65 across from the detection surface 75*a* is unique to the detection surface 75*a*, even symbols that are the same can be individually identified by the order in which they are arranged on the reel. Accordingly, when the boundary of each detection surface 75*a* passes the position across from the distance sensor 65, the symbol position on the reel 67 can be accurately detected, and the symbol position on the reel can be detected by rotating the reel only slightly. The phrase "symbol position on the reel 67" here refers to the state of the reel 67 determined by the positions of the individual symbols on the reel 67 with respect to the rotational displacement of the reel 67.

As a result, the game can begin in less time after the power is turned on. In addition, if deviation from the symbol position initially detected on the reel 67 should occur due to vibration, cheating from the outside, etc., the symbol can be restored to its proper position more quickly. In addition, it takes less time to stop the rotating reel at a predetermined stopping position.

In short, even without performing the starting point control that was necessary in the past, a symbol can be identified by detecting the symbol position on the reel 67, and a single symbol on the reel 67 can be given a software-based marking.

If the symbol that is supposed to be displayed is not actually being displayed due to deviation, the reel 67 may be controlled by the program so that the intended symbol is automatically restored to its displayed position. Alternatively, the reel may be moved manually so that the intended symbol is displayed.

In addition, the disk 68 has a center of gravity that is located on the rotational axis when projected onto a plane perpendicular to the rotational axis. More specifically, the disk 68 is designed by taking into account the center of gravity distribution during rotation, and the center of gravity is allocated so that there will be no imbalance when the reel 67 is rotated at 75 to 100 rpm. As a result, there is better balance in the weight of the disk 68 with respect to the rotational axis, and the rotation of the reel 67 can be stabilized.

The fact that the convex members 69 each have at the top a detection surface 75*a* whose distance from the rotational axis is within a unique range means that the distance to the distance sensor 65 is also within a unique range for each detection surface 75. Therefore, detecting the distance from a detection surface 75 to the distance sensor 65 with the distance sensor 65 is equivalent to detecting the distance from the rotational axis to a detection surface 75.

Figure 4:
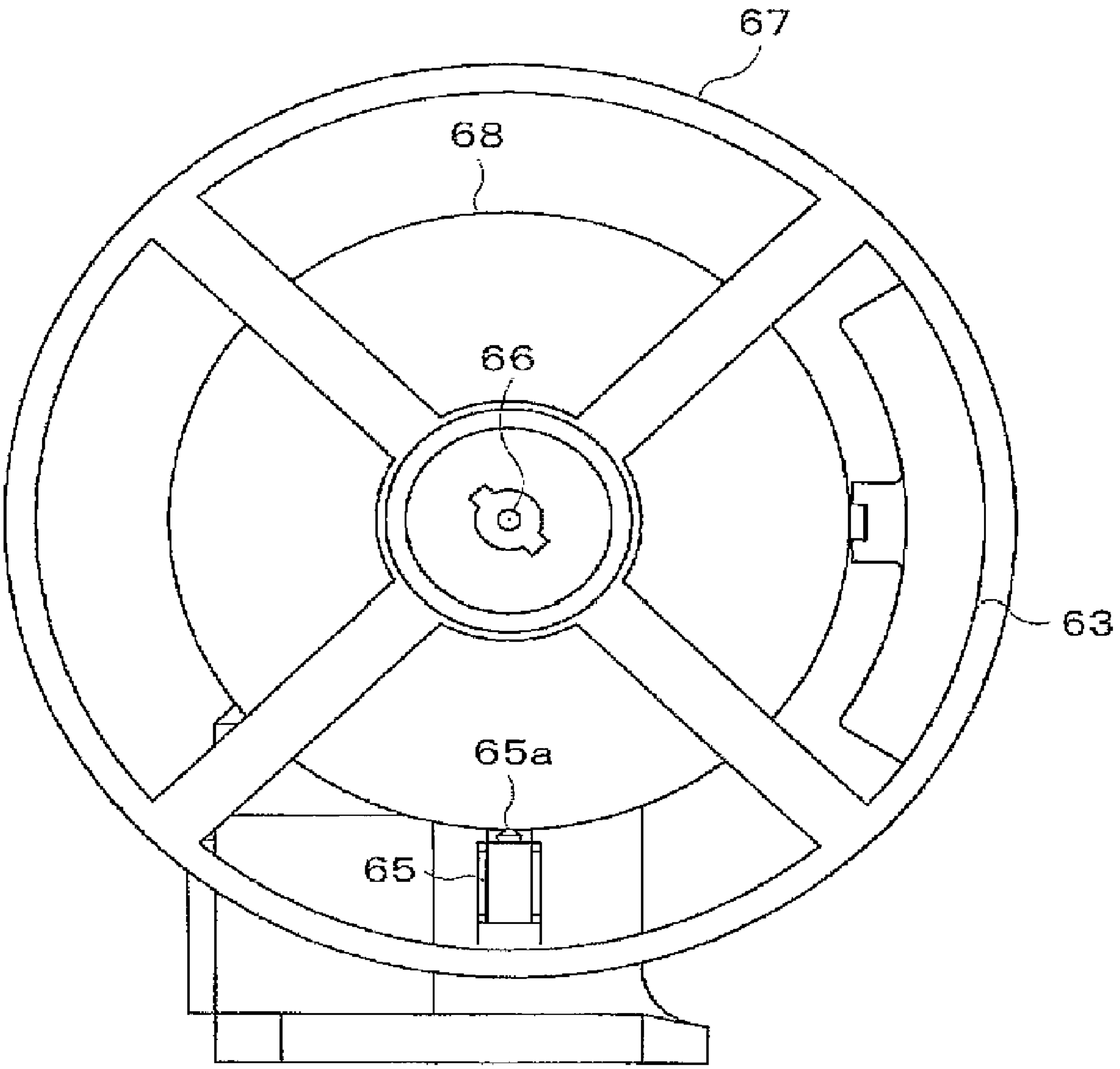
FIG. 4 is a side view in which the reel unit of the mechanical slot machine according to Embodiment 1 is seen from the direction indicated by arrow C in FIG. 3.

FIG. 4 is a side view, in which the reel unit 37 of the mechanical slot machine 1 according to Embodiment 1 is seen from the direction indicated by arrow C in FIG. 3. As shown in FIG. 4, the lamp holder 63 is disposed facing the symbol display region 8 so that it illuminates the symbols on the reel 67 from behind, making the symbols easier to see.

The distance sensor 65 is disposed so that its detecting component 65*a* is across from the detection surface 75. In Embodiment 1, an ultrasonic sensor is used as the distance sensor. For example, one that has a detection range of 100 to 300 mm, a resolution of 0.5 mm, and a sampling period of 1 ms is used. This allows even minute differences in distance above each detection surface to be detected at high precision.

In addition to an ultrasonic sensor, an electromagnetic sensor or the like may be used, as long as it is a distance sensor with enough precision to be used for detecting symbol positions. Any type of electromagnetic waves may be used, as long as they can be reflected by the detection surfaces, but a laser is particularly favorable. In addition, the reel 67 and the disk 68 have the same rotational axis because they are both connected to a shaft.

Although not shown in FIGS. 3 and 4, the lamps 63*a* and the sensor 65 are electrically connected to the CPU 30 through connectors and wiring.

Figure 5:
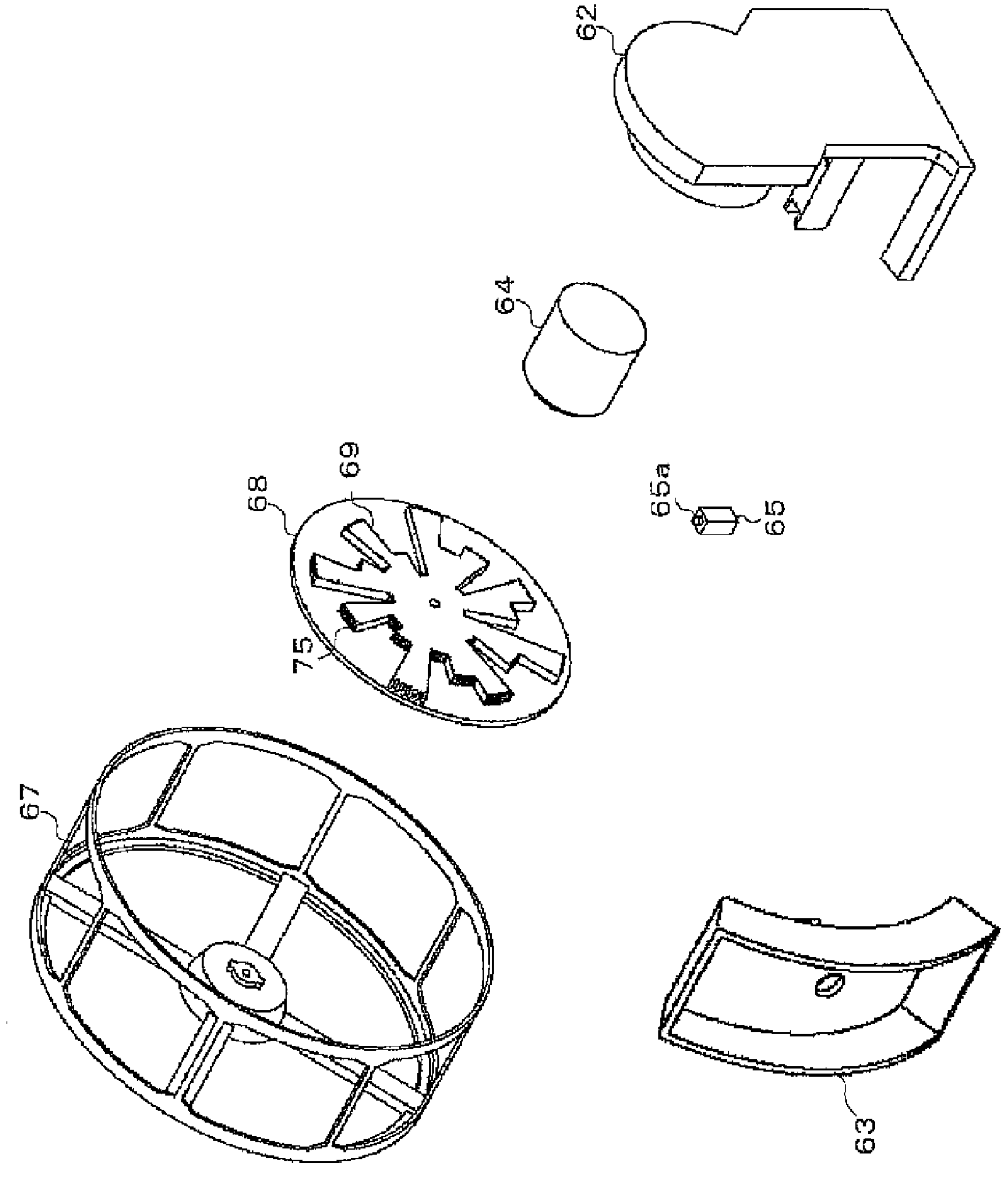
FIG. 5 is an exploded oblique view of the main components of the reel unit of the mechanical slot machine according to Embodiment 1.

FIG. 5 is an oblique view of the main components when the reel unit 37 of the mechanical slot machine according to Embodiment 1 is exploded. A groove in which the distance sensor 65 is fitted is provided at a specific location on the reel body 62.

Figure 6:
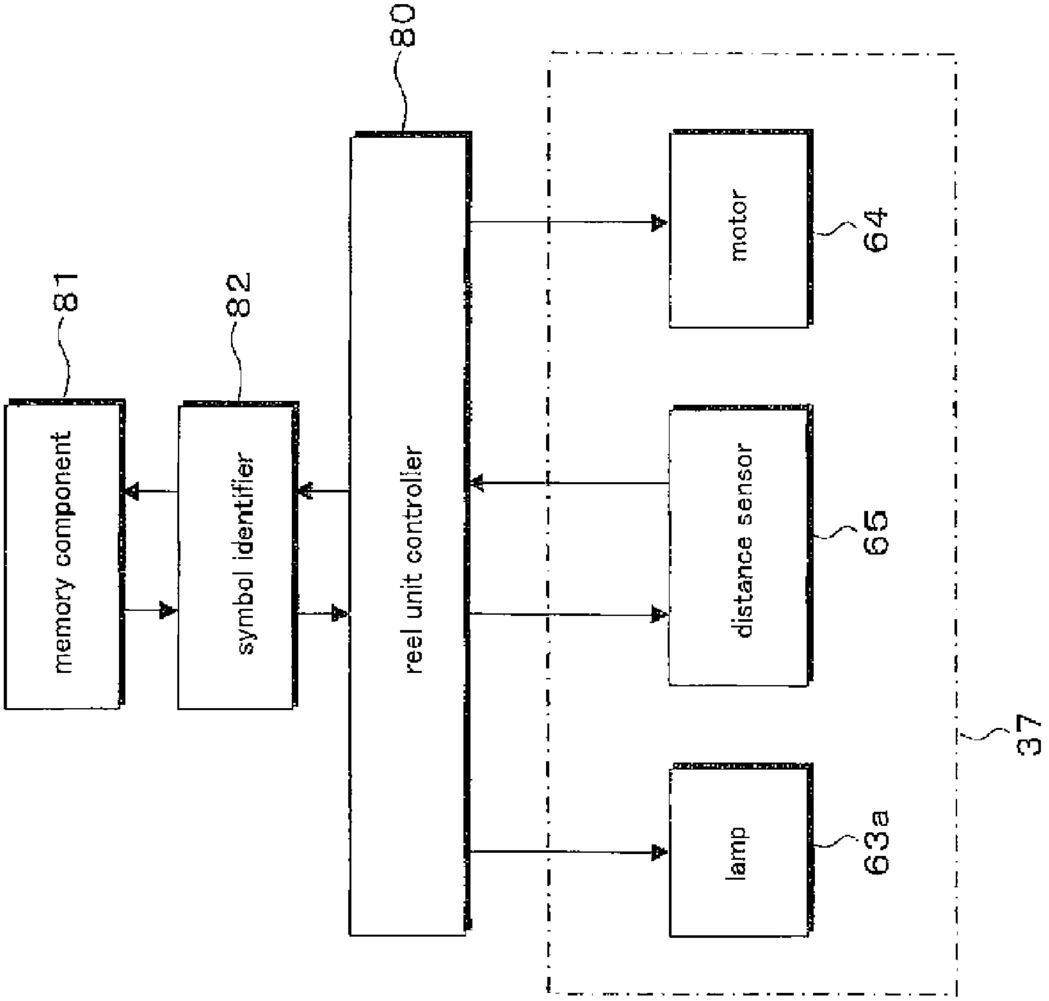
FIG. 6 is a block diagram illustrating the electrical configuration of the reel unit, the reel unit controller, the memory component, and the symbol identifier of the mechanical slot machine according to Embodiment 1.

FIG. 6 is a block diagram illustrating the electrical configuration of the reel unit 37, the reel unit controller 80, the memory component 81, and the symbol identifier 82 of the mechanical slot machine according to Embodiment 1. As shown in FIG. 6, the reel unit 37 of the mechanical slot machine electrically comprises the lamps 63*a*, the motor 64, and the distance sensor 65. The reel unit controller 80 comprises the CPU 30, the clock generation circuit 33, the output port 35, and the input port 43 shown in FIG. 2, and performs control operations according to a preset program. The memory component 81, which is made up of the ROM 31 and the RAM 32, stores a program for displayed symbol identification, as well as a control program for controlling the operation of the motor 64 by reflecting the identified symbol, data for a profile of one revolution of the disk, first data correlating symbols with distances from the detection surface 75 to the distance sensor 65, and so forth. "Profile" as used here means information giving the shape around the periphery of a rotating object as developed in plan view. The symbol identifier 82 substantially comprises the CPU 30 shown in FIG. 2.

A symbol corresponding to the distance from a detection surface 75 to the distance sensor 65 may be an ordinary symbol, or it may be a blank. Correspondence with a symbol is evaluated by the program through reference to a table, but may also be evaluated directly by the program.

The symbol identifier 82 identifies the symbol currently being displayed by comparing information about the distance from the detection surface 75 to the distance sensor 65 as detected by the program, with the table stored in the memory component 81. More specifically, the displayed symbol is identified when the distance from the detection surface 75 to the distance sensor 65 at the position of the distance sensor 65 is within a specific range.

Furthermore, the symbol identifier 82 detects the current symbol position on the reel 67 by comparing information about the distance from the detection surface 75 to the distance sensor 65 as detected by the program, with the profile stored in the memory component 81. More specifically, since the distance from the detection surface 75 to the distance sensor 65 is unique for each detection surface 75, the boundary between adjacent detection surfaces is detected, and the symbol position on the reel 67 is detected.

The control signals outputted from the CPU 30 are outputted through the output port 35 to the lamps 63*a*, the motor 64, or the distance sensor 65. The signals outputted from the distance sensor 65 are inputted through the input port 43 to the CPU 30.

The displayed symbol identifier according to Embodiment 1 comprises the disk 68, the distance sensor 65, the memory component 81, and the symbol identifier 82. As a result, the symbol being displayed can be identified by detecting the unique distance from the detection surface 75 to the distance sensor 65, and comparing this distance range with first data that has been made to correspond to the individual symbols. In addition, because the distance to the distance sensor varies greatly at the boundary between adjacent detection surfaces, the symbol position on the reel 67 can be identified by detecting the unique distance from the detection surface 75 to the distance sensor 65.

As discussed above, in Embodiment 1, the reel unit controller 80 is formed by the CPU 30 and so forth, but a control board may be provided for each reel unit 37, installed on the reel body, and the functions of these may be included in these control boards. In this case, the primary role of the control board arranged on each reel unit 37 will be to relay signals between the CPU 30 and the reel unit 37.

Figure 7:
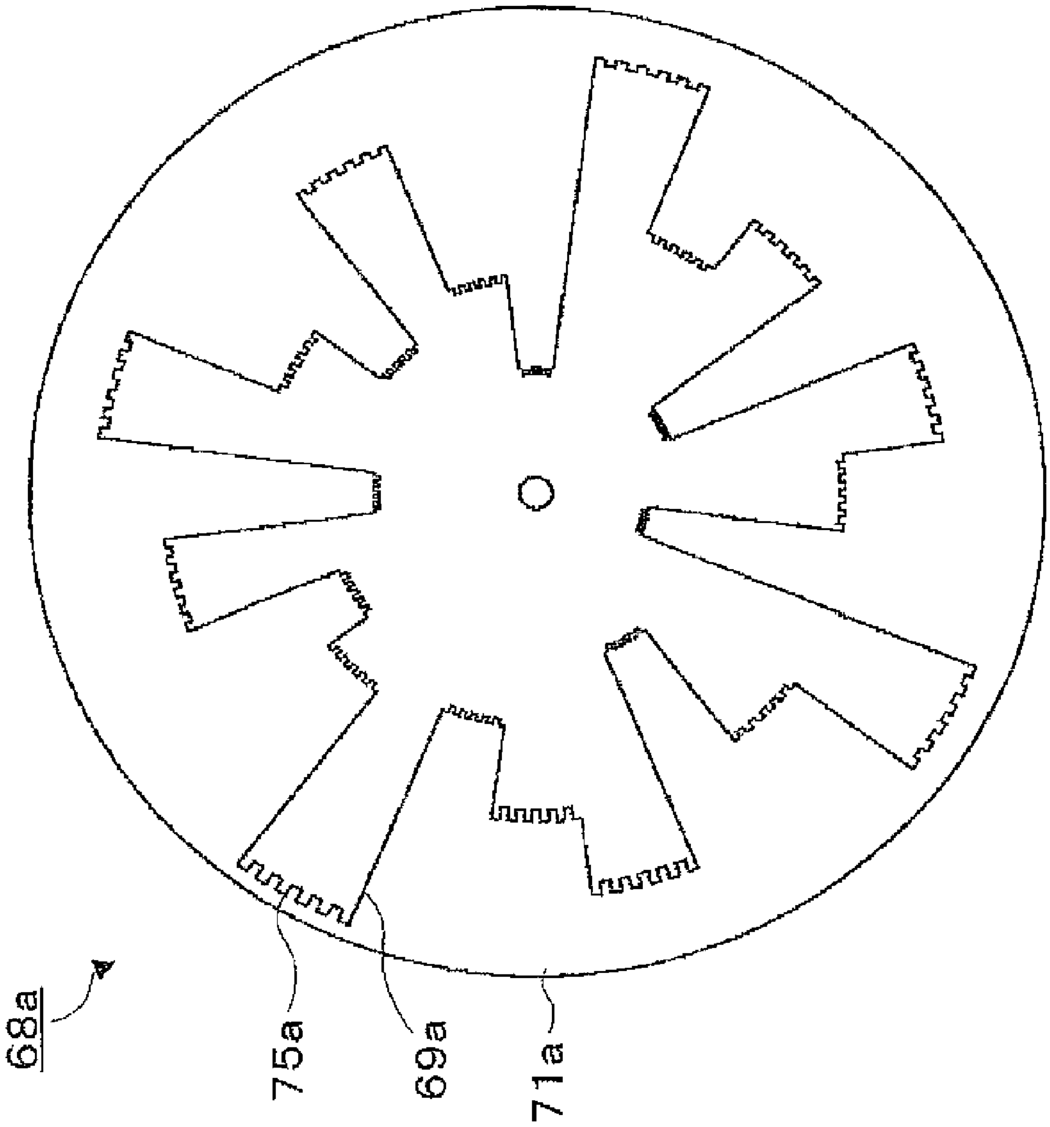
FIG. 7 is a plan view of a disk according to Embodiment 1.

FIG. 7 is a plan view of a disk 68*a* according to Embodiment 1. As shown in FIG. 7, the disk surface 71*a* of the disk 68*a* is provided with a plurality of convex members 69*a* protruding radially around the rotational axis, and the plurality of convex members 69*a* each have at the top a detection surface 75*a* whose distance from the rotational axis is within a unique range. There are usually 24 of the convex members 69*a*. Of these, 12 correspond to ordinary symbols, and the other 12 to blanks. Any plastic or the like that is suited to forming the convex members 69*a* can be used for the material of the disk 68*a*.

As shown in FIG. 7, each detection surface 75*a* has a square-toothed serrated shape. After a symbol has been displayed where it is supposed to be displayed, even if the player should move the reel 67 slightly by cheating, any deviation resulting from this cheating can be detected with ease. In addition, since even a minute deviation will result in a significant difference in the distance from the detection surface to the rotational axis between the peaks and valleys of the serrations, such deviation can be detected with ease. The shape of the detection surface 75*a* may also be sinusoidal or saw-toothed.

Figure 8:
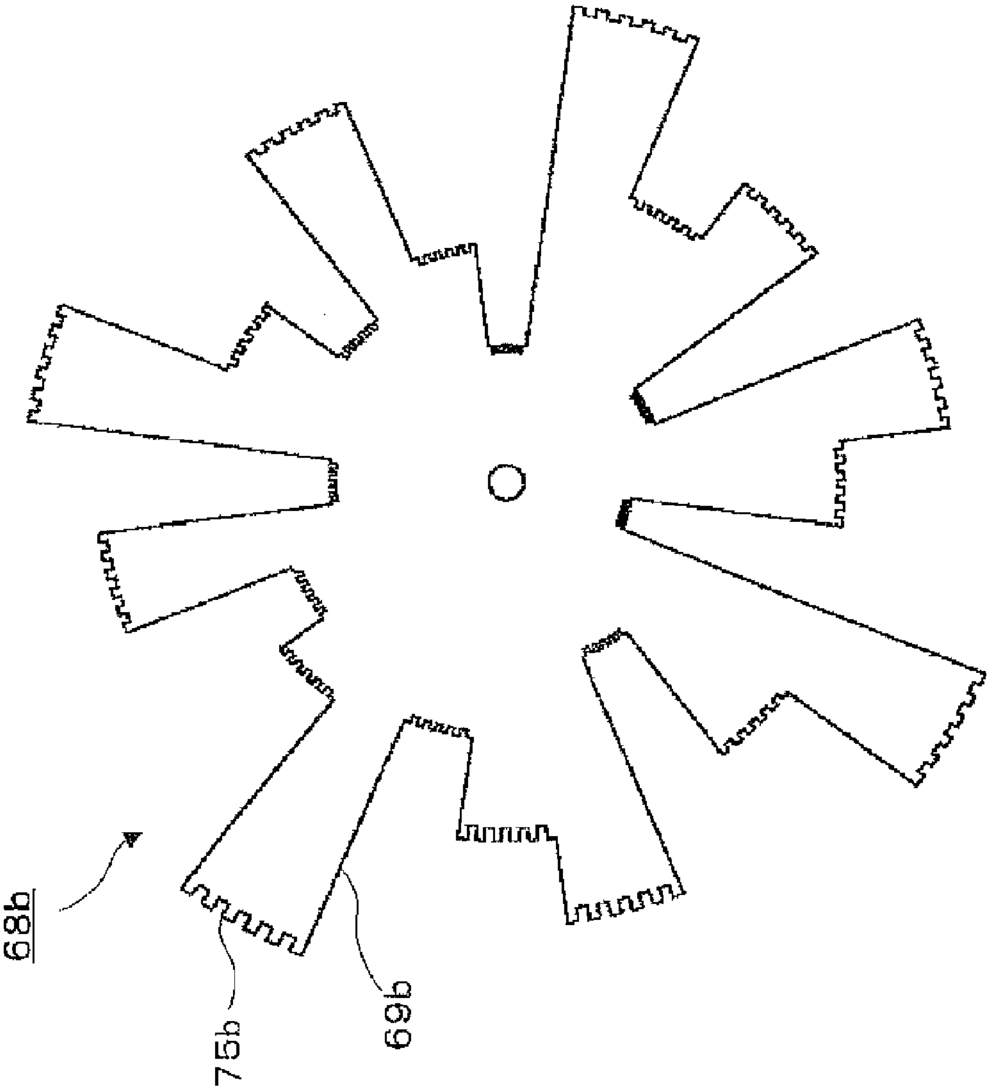
FIG. 8 is a plan view of a disk according to Embodiment 1.

FIG. 8 is a plan view of a disk 68*b* comprising only convex members 69*b* that protrude radially from the rotational axis. The above-mentioned disk 68*a* was in a form in which the convex members 69*a* were added to the disk surface 71*a*, but as shown in FIG. 8, the disk may comprise just the convex members 69*b* protruding radially from the rotational axis. The detection surfaces 75*b* have the same square-toothed serrated shape as the detection surfaces 75*a*. Irregularities on the surface of a shaft may also be utilized as detection surfaces.

Figure 9:
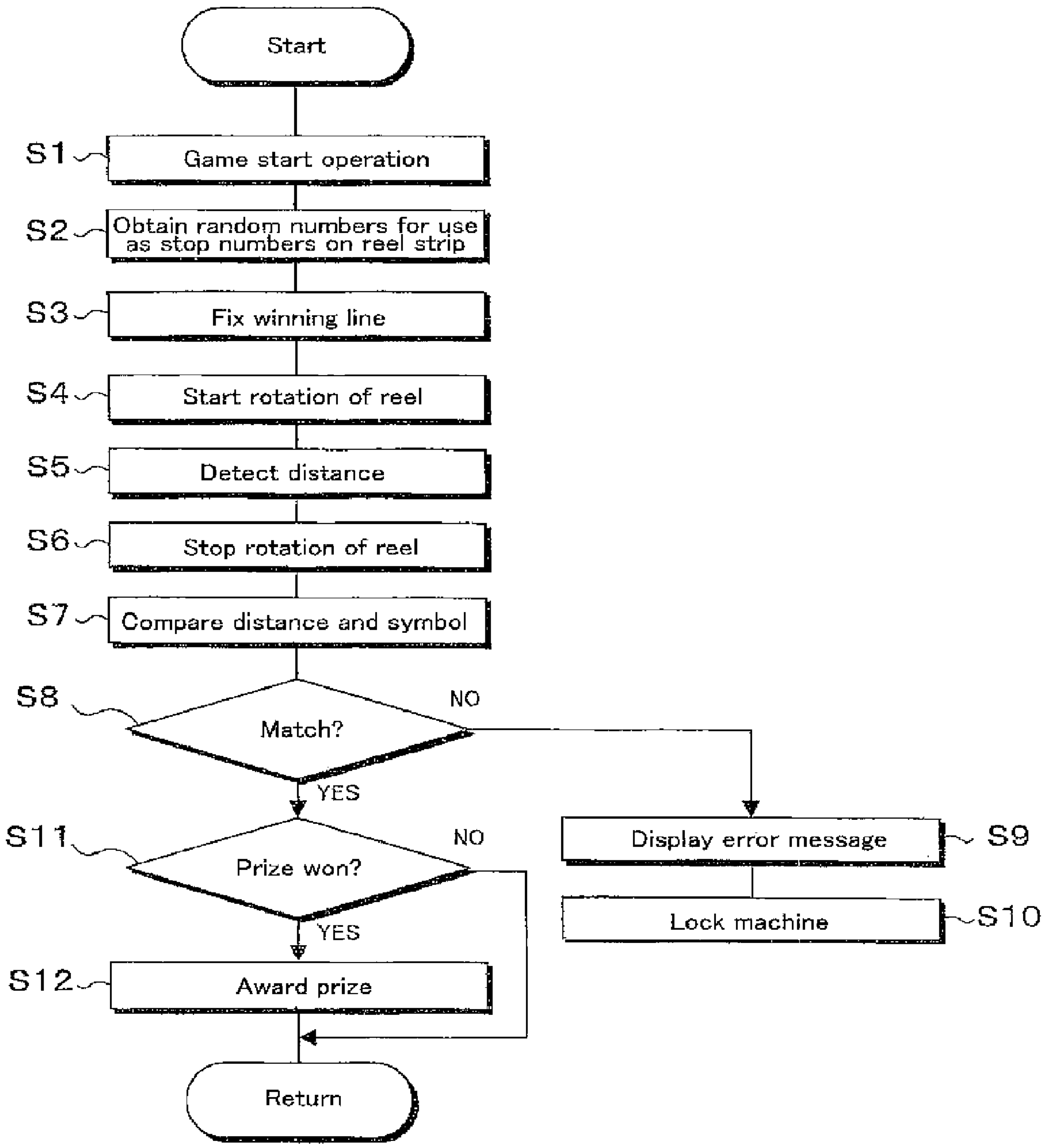
FIG. 9 is a flowchart illustrating the operation of the mechanical slot machine according to the configuration in Embodiment 1.

Next, the operation of the mechanical slot machine according to this embodiment and formed as above will be described. FIG. 9 is a flowchart illustrating the characteristic operation of a gaming machine according to the configuration in Embodiment 1.

First, the game is started in the usual manner by input from the player (step S1). Here, as discussed above, the player places a bet to specify a winning line, and presses the spin button 11.

Next, random numbers are obtained for use as stop numbers on the reel strip on the first to third reels (step S2), and the winning line is fixed (step S3). The rotation of the first to third reels is then started (step S4). At this point, the symbol display component 7 shows that the symbols are rotating and fluctuating in the symbol display regions of the various reels. The direction of rotation may be from the top down, or from the bottom up. Furthermore, the reels may be provided horizontally rather than vertically, and may rotated from left to right, or from right to left.

Figure 10:
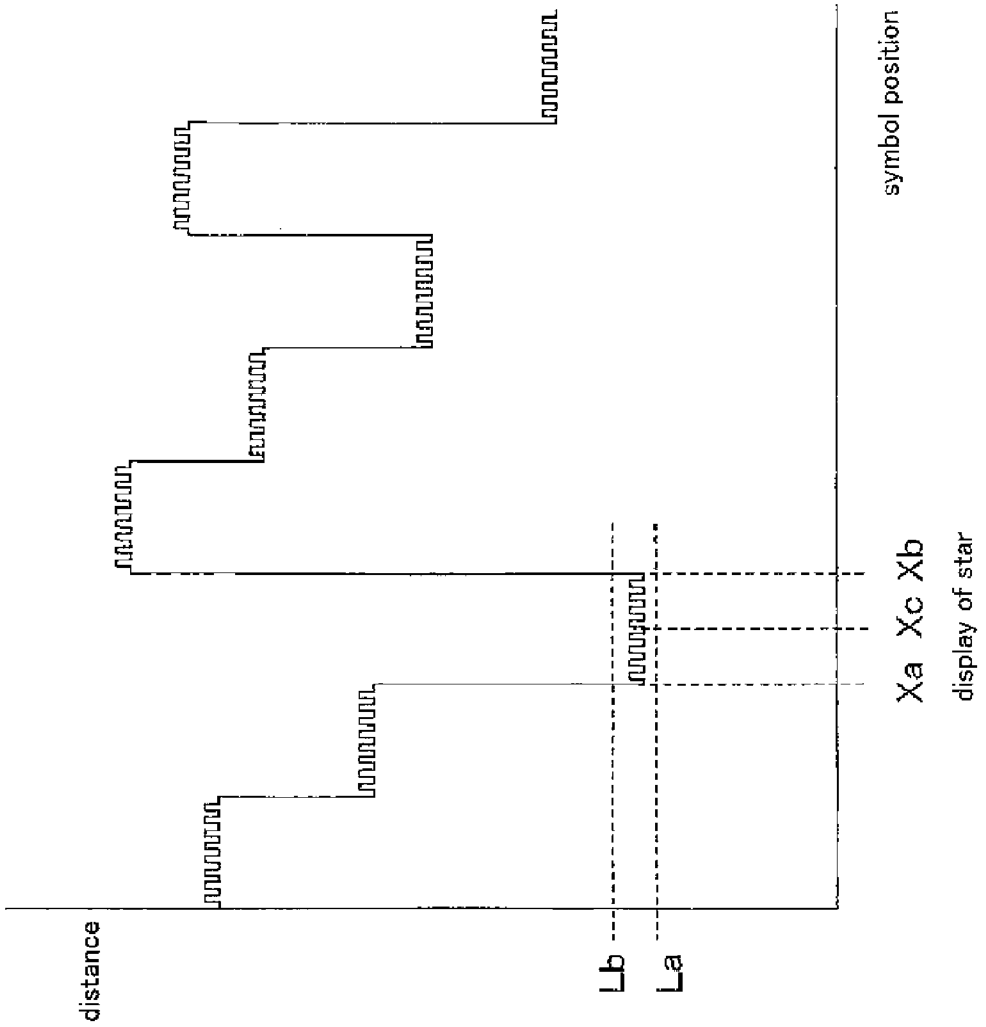
FIG. 10 is a diagram illustrating the relationship between the symbol position on the reel and the distance from the detection surface to the distance sensor of the disk according to Embodiment 1.

The distance from the detection surface 75*a* is then detected by the distance sensor 65 (step S5). FIG. 10 is a diagram illustrating the relationship between the symbol position on the reel 67 and the detected distance from the detection surface 75*a* to the distance sensor 65. Information that thus develops in plan view the shape around the periphery of a rotating object is called a profile. Here, the digitized symbol position on the reel is expressed by X.

As shown in FIG. 10, when the distance sensor 65 detects a boundary Xa between adjacent detection surfaces from profile data stored ahead of time, this boundary Xa is a unique symbol position. When a boundary of a detection surface corresponding to the symbol to be stopped is detected, the rotation of the reel is stopped by the motor in the center of that detection surface. For instance, Xc shown in FIG. 10 is the center of the above-mentioned detection surface. Rotation from the boundary of the detection surface 75*a* to the center is controlled according to the rotational speed and duration of the reel 67. This control may also be accomplished by counting the serration peaks arranged on the detection surface 75*a*. Control for stopping the rotation of the reel 67 is performed by means of the evaluation performed by the reel unit controller 80, and the transmission of signals to the motor 64.

Figure 11:
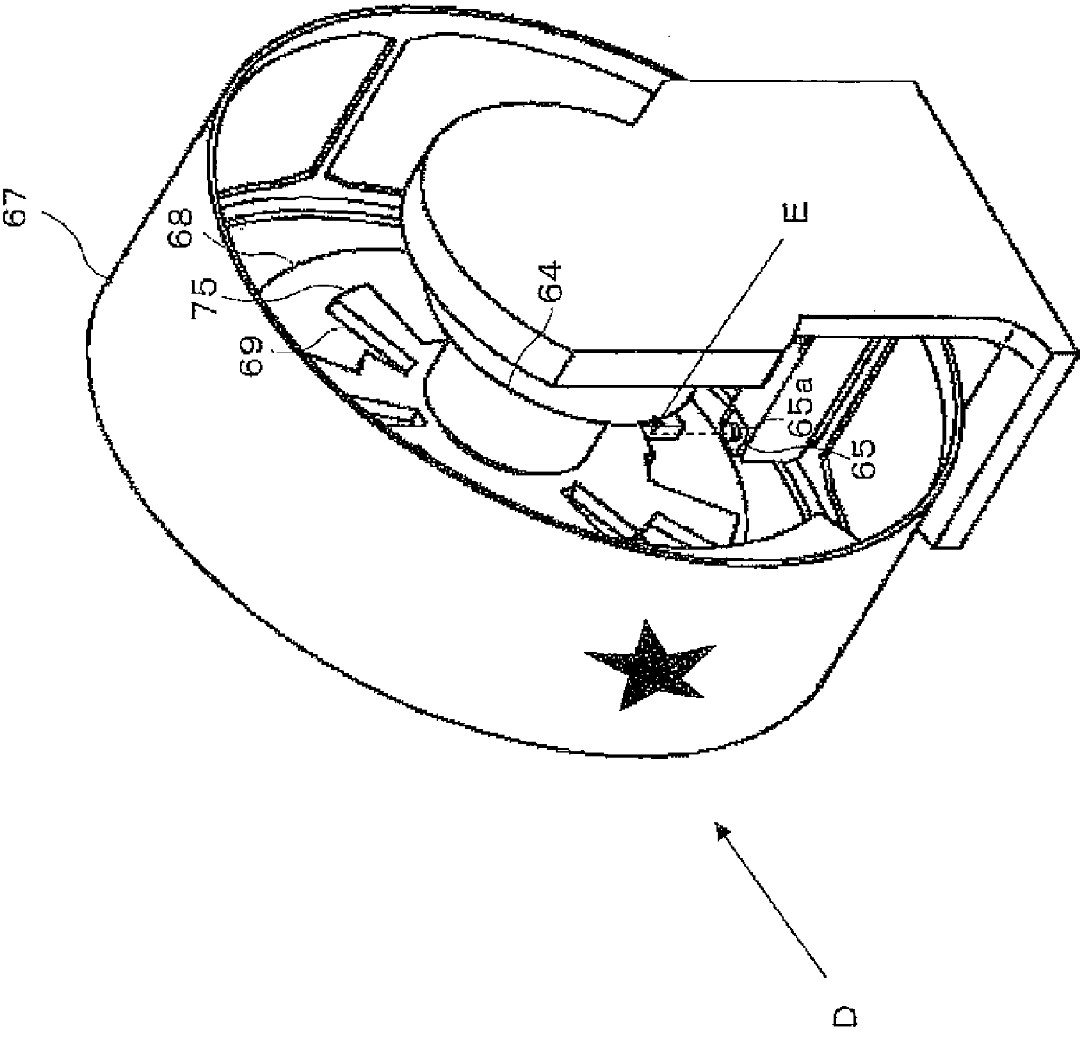
FIG. 11 is a diagram illustrating the operation of a reel unit.

For instance, when the center of a star symbol is to be stopped in the center D of the symbol display region 8 as shown in FIG. 11, the motor 64 is controlled so that the rotation of the reel will be stopped in the center of the detection surface 75*a* corresponding to the star symbol, at the position E across from the distance sensor 65. The symbols other than the star have been omitted from the reel 67 in FIG. 11.

The rotation of the first to third reels is successively stopped on the basis of the signals transmitted from the above-mentioned reel unit controller 80 (step S6). We will assume here that the reels are stopped one after the other at specific time intervals, starting with the first reel and ending with the third reel. The time interval can be 0.5 second, for example.

Next, the symbol to be displayed is compared with the detected distance from the detection surface 75*a* to the distance sensor 65 (step S7), and it is decided whether or not there is a match (step S8). For example, a star symbol is stored as data in the form of a table in which the distance from the detection surface 75*a* to the distance sensor 65 corresponds to the range La to Lb. This data corresponds to the first data. In this case, as shown in FIG. 10, when a detection surface 75*a* is located across from the distance sensor 65, and the distance from this detection surface 75*a* to the distance sensor 65 is between La and Lb, it is determined that the symbol position on the reel is from Xa to Xb, and that the star symbol is in the symbol display region 8. In this manner, the distance from the detection surface 75*a* to the distance sensor 65 is detected, it is determined that this distance is from La to Lb, and the displayed symbol is confirmed to be the star symbol.

If the symbol that is supposed to be displayed is not being displayed, an error message is displayed (step S9) and the machine is locked (step S10). If the symbol that is supposed to be displayed is being displayed, the routine proceeds to step S13. It is then decided whether or not a prize has been won (step S11). If no prize has been won, the routine returns to a game start stand-by mode. If a prize has been won, however, the result is that the accumulated coin count (credits) is added as the prize dividend (step S12). The routine then returns to a game start stand-by mode.

Embodiment 2

Figure 12:
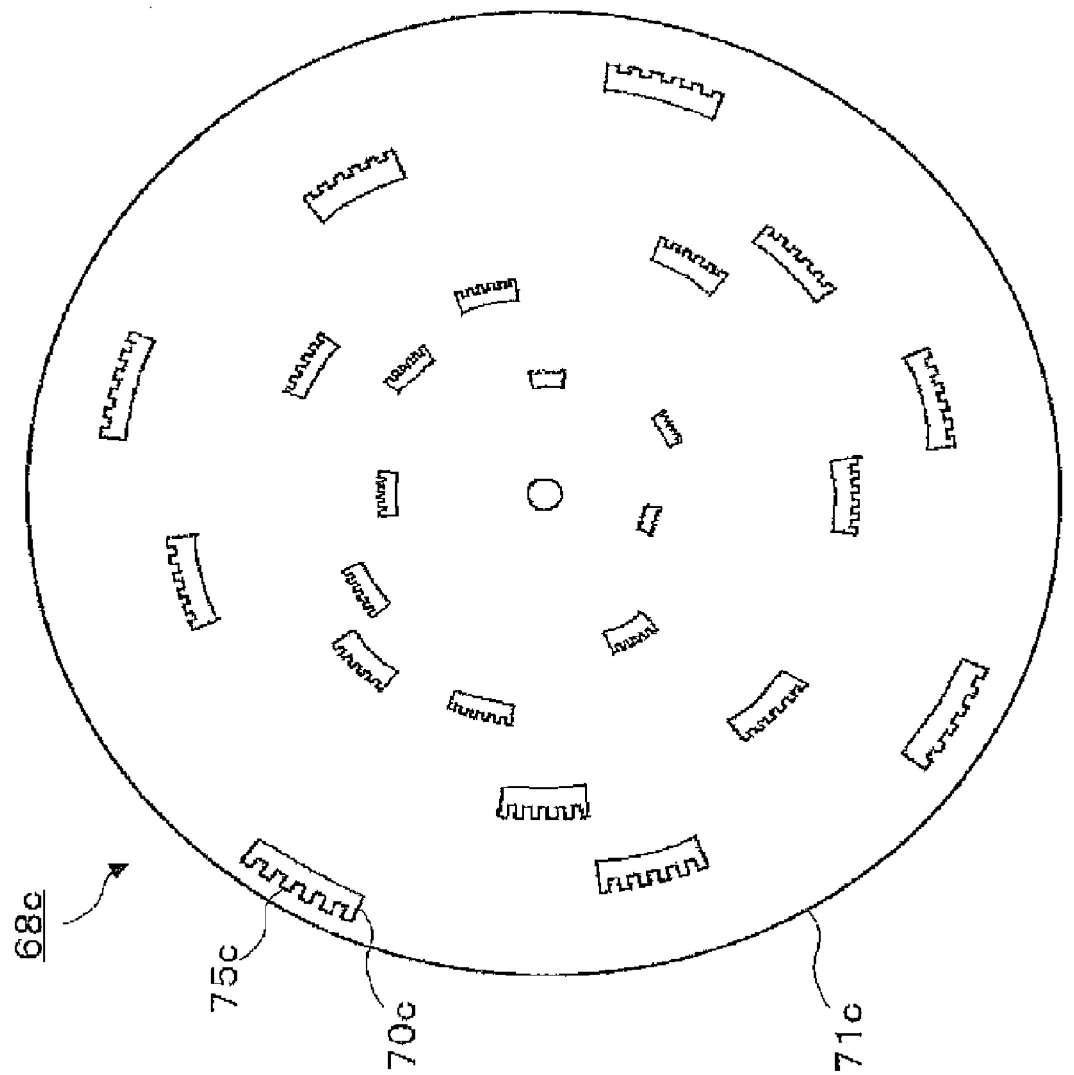
FIG. 12 is a plan view of the disk according to Embodiment 2.

FIG. 12 is a plan view of a disk 68*c* equipped with a plurality of protrusions 70*c* protruding in the thickness direction. In Embodiment 1, the disk surface 71*a* of the disk 68*a* was equipped with the plurality of convex members 69*a* protruding radially around the rotational axis, but as shown in FIG. 12, the disk may instead be equipped with the plurality of protrusions 70*c* protruding in the thickness direction.

As a result, if each symbol is made to correspond to a unique range of distances to the detection surface 75*c*, the unique distance to the distance sensor across from the detection surface 75*c* can be detected, and the symbol currently being displayed can be identified. In addition, the displayed symbol can be identified immediately after the power has been turned on, without having to rotate the reel 67.

In addition, since the distance to the distance sensor across from the detection surface 75*c* is in a range unique to the detection surface 75*c*, even symbols that are the same can be individually identified by the order in which they are arranged on the reel. Accordingly, when the boundary of each detection surface passes the position across from the distance sensor, the symbol position on the reel 67 can be accurately detected, and the symbol position on the reel 67 can be detected by rotating the reel 67 only slightly.

As a result, the game can begin in less time after the power is turned on. In addition, if deviation from the symbol position initially detected on the reel 67 should occur due to vibration, cheating from the outside, etc., the symbol can be restored to its proper position more quickly. In addition, it takes less time to stop the rotating reel 67 at a predetermined stopping position.

In addition, if the detection surfaces 75*c* are arranged on the rotational axis side, the detecting component 65*a* of the distance sensor 65 can be arranged on this rotational axis side so as to be across from the detection surfaces 75*c*. As a result, the distance sensor 65 can be easily accommodated within the reel 67 even if the sensor is large. Conversely, the reel 67 can be made smaller for a distance sensor of the same size. The detection surfaces 75*c* have the same square-toothed serrated shape as the detection surfaces 75*a*.

As shown in FIG. 12, the protrusions 70*c* of the disk 68*c* are arc-shaped, but may also be crescent-shaped or fan-shaped. Fan-shaped protrusions include those in which the convex members 69*a* of the disk 68*a* shown in FIG. 7 are segmented radially.

Furthermore, the disk surface 71*c* of the disk 68*c* may be equipped with a stopper, and the protrusions 70*c* may be attached and detached to and from this stopper. The "disk surface" is a plane substantially perpendicular to the thickness direction of the disk. Accordingly, the profile of the detection surface 75*c* can be easily modified merely by attaching or removing the protrusions 70*c* to or from the disk surface 71*c*. For example, when the reel strip is modified and the number of symbols is increased or decreased, the detection surfaces corresponding to this increase or decrease in the number of symbols can be simply created merely by attaching or detaching the protrusions 70*c* to or from the disk surface 71*c*.

The stopper may be a groove that mates with part of the protrusions 70*c*, or the protrusions 70*c* may be latched with threads or the like that mate with a threaded groove arranged on the protrusions 70*c*.

Embodiment 3

In Embodiment 1, the distance from the detection surface 75*a* to the distance sensor 65 was within a range unique to that detection surface 75*a*, but may instead be within a range unique to a symbol. Specifically, the disk may be such that the above-mentioned distance is within the same range for surfaces corresponding to identical symbols.

Figure 13:
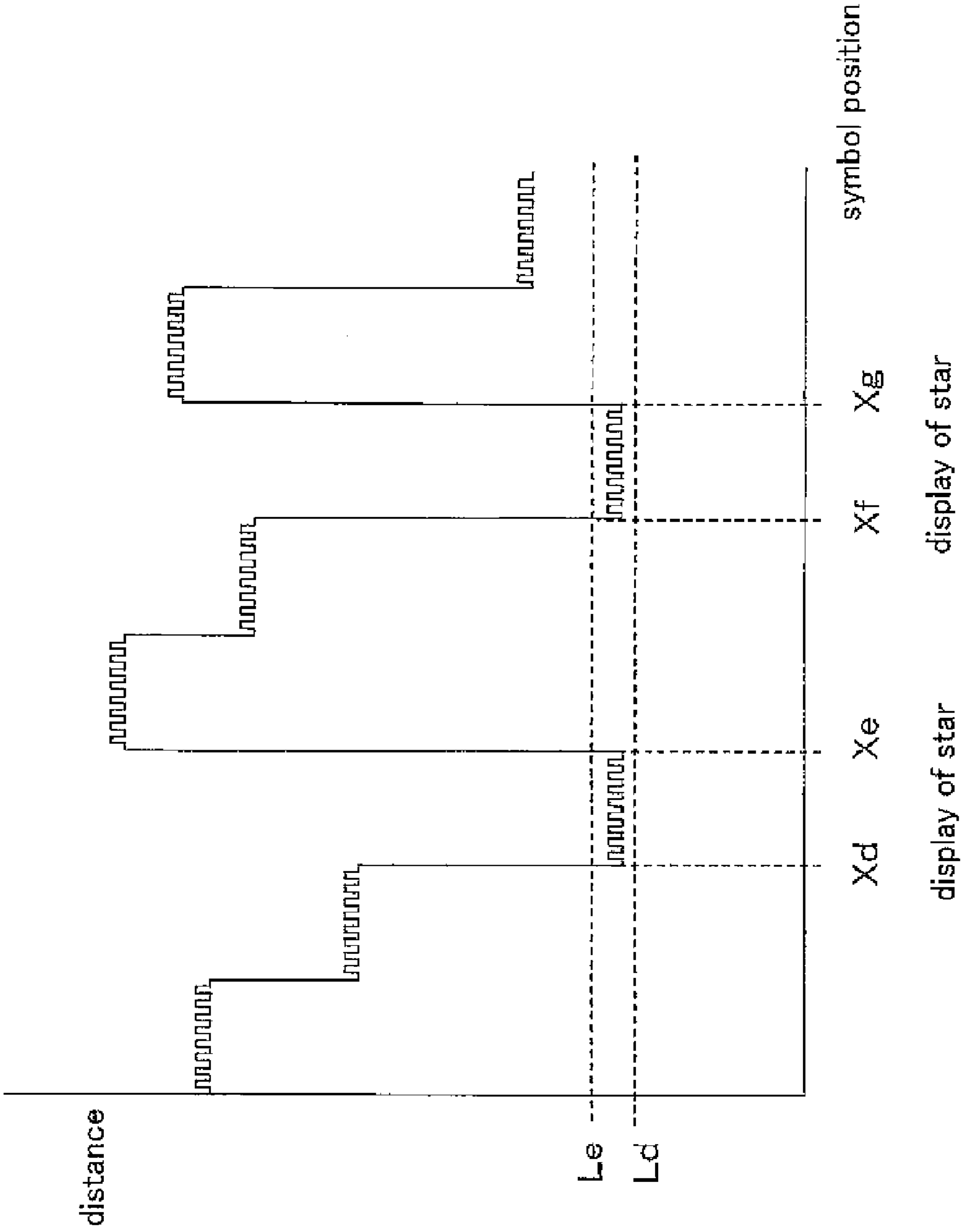
FIG. 13 is a diagram illustrating the relationship between the symbol position on the reel and the distance from the detection surface to the distance sensor of the disk according to Embodiment 3.

FIG. 13 is a diagram illustrating the relationship between the symbol position on the reel of the disk according to Embodiment 3, and the distance from a detection surface 75 to the distance sensor 65. As shown in FIG. 13, ranges Xd-Xe and Xf-Xg for different symbol positions both correspond to a star symbol, and the distance from the detection surface 75 in this symbol position to the distance sensor 65 is Ld to Le in both cases.

As a result, the unique distance to the distance sensor 65 across from a detection surface 75 can be detected, and the symbol currently being displayed can be identified. In addition, the displayed symbol can be identified immediately after the power has been turned on, without having to rotate the reel.

In addition, of the boundaries of the various detection surfaces 75, when a boundary whose change in distance is unique within the profile for one revolution passes the position across from the distance sensor 65, the symbol position on the reel 67 can be accurately detected, and the symbol position on the reel 67 can be detected without even one rotation. Further, just as in Embodiment 1, the disk may comprise only convex members protruding radially from the rotational axis, or irregularities on the surface of a shaft may also be utilized as detection surfaces.

Embodiment 4

Figure 14:
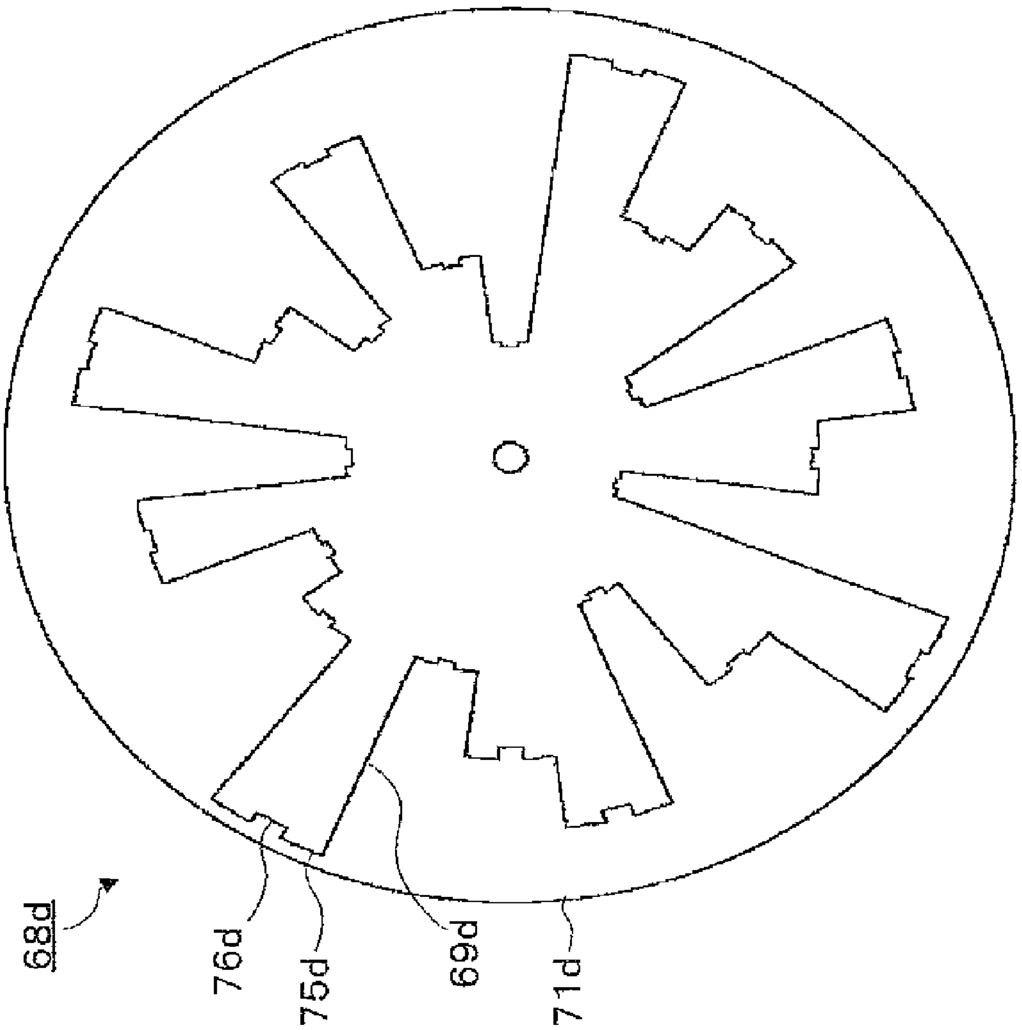
FIG. 14 is a plan view of the disk according to Embodiment 4.
Figure 15:
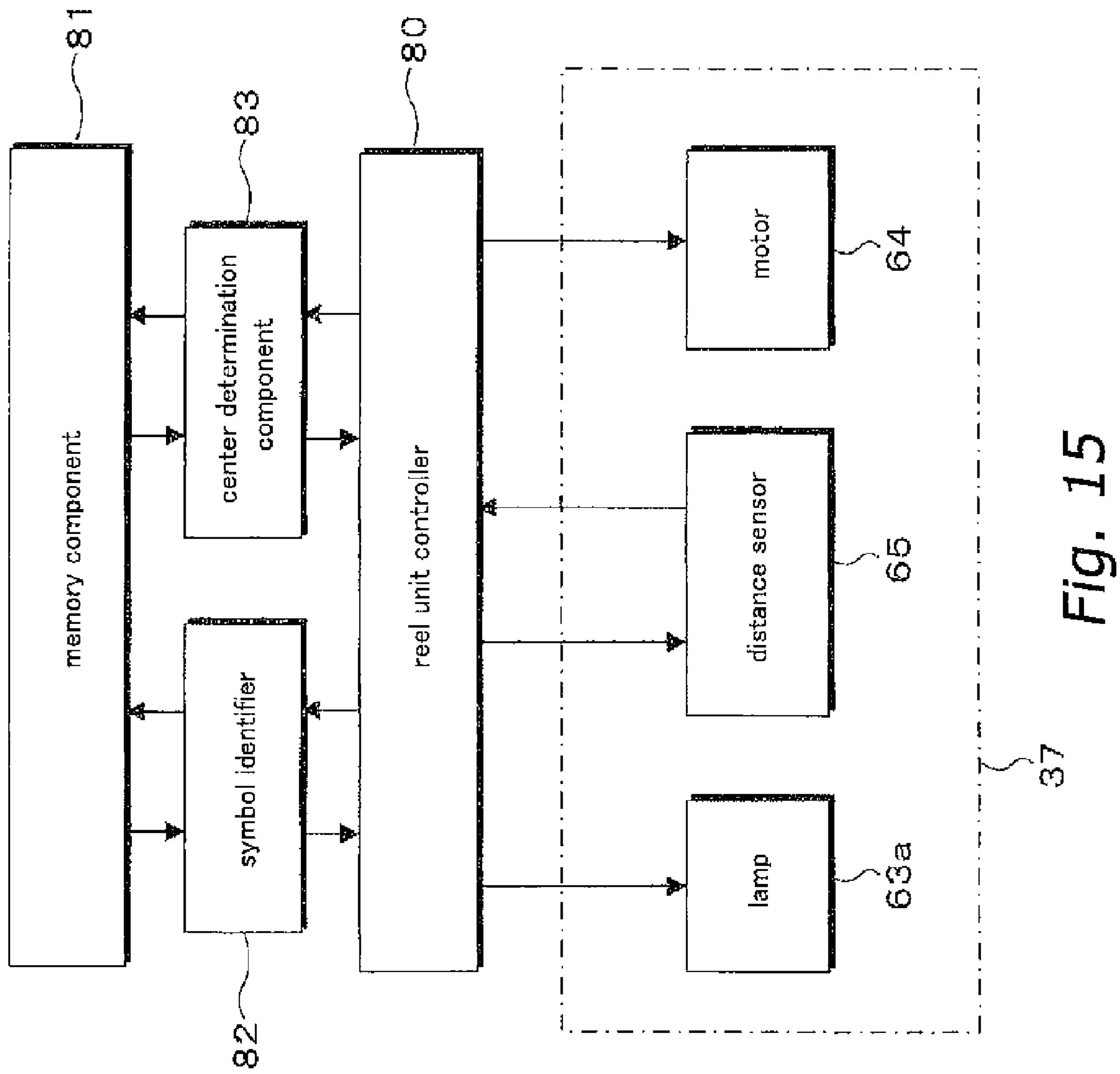
FIG. 15 is a block diagram illustrating the electrical configuration of the reel unit, the reel unit controller, the memory component, the symbol identifier, and the center determination component of the mechanical slot machine according to Embodiment 4.

In Embodiment 1, the detection surfaces 75*a* were uniform in shape over the entire surface, but as shown in FIG. 14, the distance between the rotational axis and the center part 76*d* of a detection surface 75*d* arranged on convex members 69*d* of a disk surface 71*d* may be set to be within a unique range for each center part.

In this case, a center determination component 83 is needed for determining whether or not the center of the symbol being displayed is in the middle region of the symbol display region 8. The center determination component 83 substantially comprises the CPU 30 shown in FIG. 2. We will let the center of the symbol here be the intersection between diagonals of the rectangular region allotted to a symbol. The displayed symbol identifier according to Embodiment 4 comprises the disk 68*d*, the distance sensor 65, the memory component 81, the symbol identifier 82, and the center determination component 83.

In Embodiment 4, after the reel 67 has stopped rotating, the center determination component 83 determines whether or not the center part 76*d* of the detection surface 75*d* is located across from the distance sensor 65. The shape of the disk 68*d* and the position of the distance sensor 65 are set ahead of time so that when the center part 76*d* of the detection surface 75*d* is located across from the distance sensor, the center of the symbol corresponding to that detection surface will be displayed in the middle region of the symbol display region 8.

Figure 16:
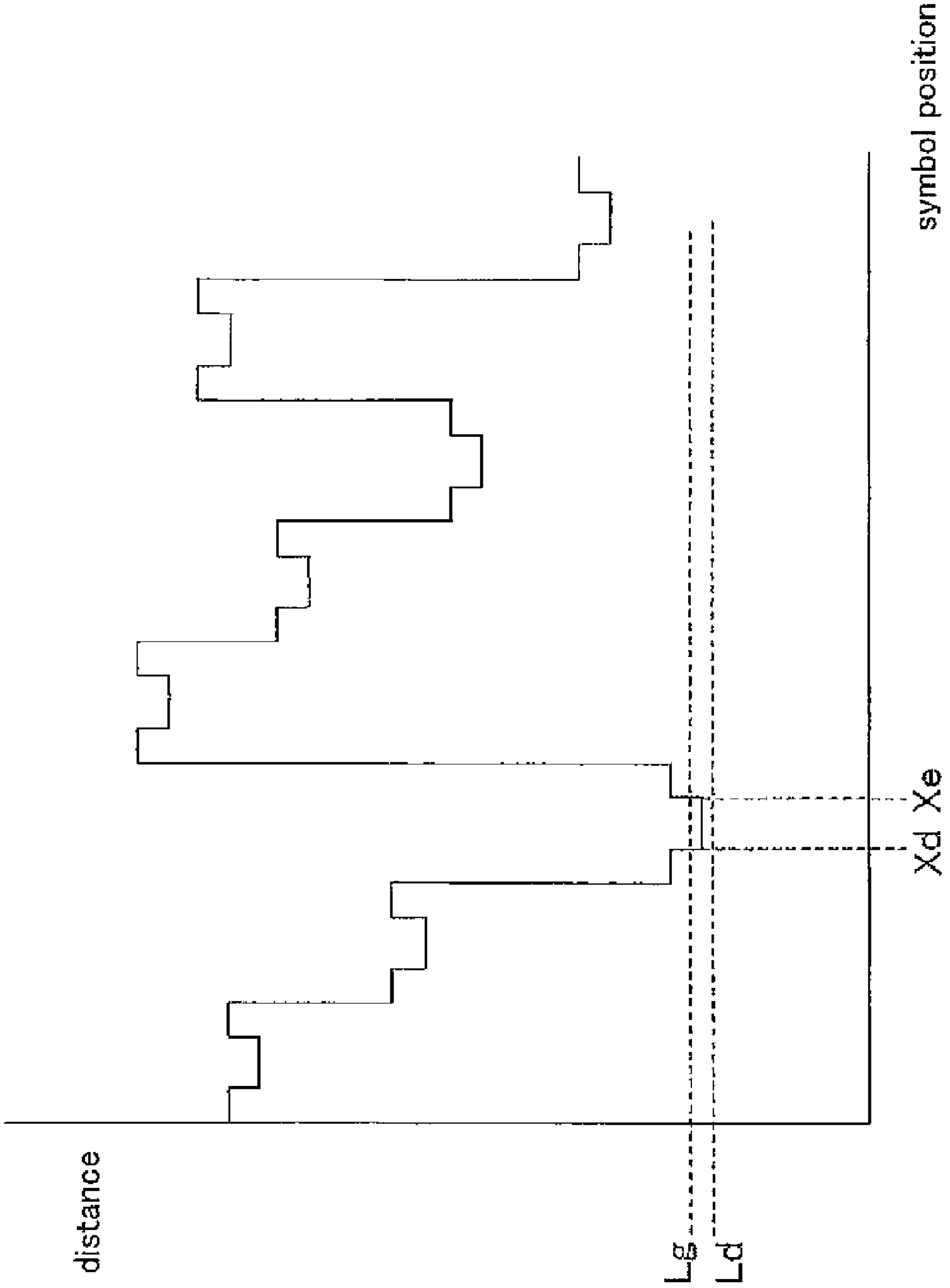
FIG. 16 is a diagram illustrating the relationship between the symbol position on the reel and the distance from the detection surface to the distance sensor of the disk according to Embodiment 4.

For example, let us assume that data in the form of a table is stored ahead of time in the memory component 81, with the distance from the detection surface 75*a* to the distance sensor 65 corresponding to the range La to Lb. This data correspond to second data. In this case, as shown in FIG. 16, it can be seen that the symbol position on the reel 67 is in the range of Xd to Xe, and the center of the symbol to be displayed is in the middle region of the symbol display region 8.

As a result, if each symbol is made to correspond to a detection surface 75*d*, it can be determined whether or not the center of a displayed symbol has stopped in the middle region of the symbol display region 8. In addition, when the rotating reel 67 is being stopped, the center of the symbol can be stopped in the middle region of the symbol display region 8 by detecting the distance unique to the center part 76*d* of that detection surface 75*d*. Specifically, when the distance sensor 65 detects a distance unique to the center part 76*d*, rotation from the boundary of the center part to its center can be controlled according to the rotational speed and duration of the reel, so that the center of the symbol is stopped in the middle region of the symbol display region.

In Embodiment 4, the center parts 76*d* of the detection surfaces 75*d* are formed in a concave shape, but may instead be formed in a convex shape. In addition, just as in Embodiment 1, the detection surfaces may be finely serrated.

Embodiment 5

Figure 17:
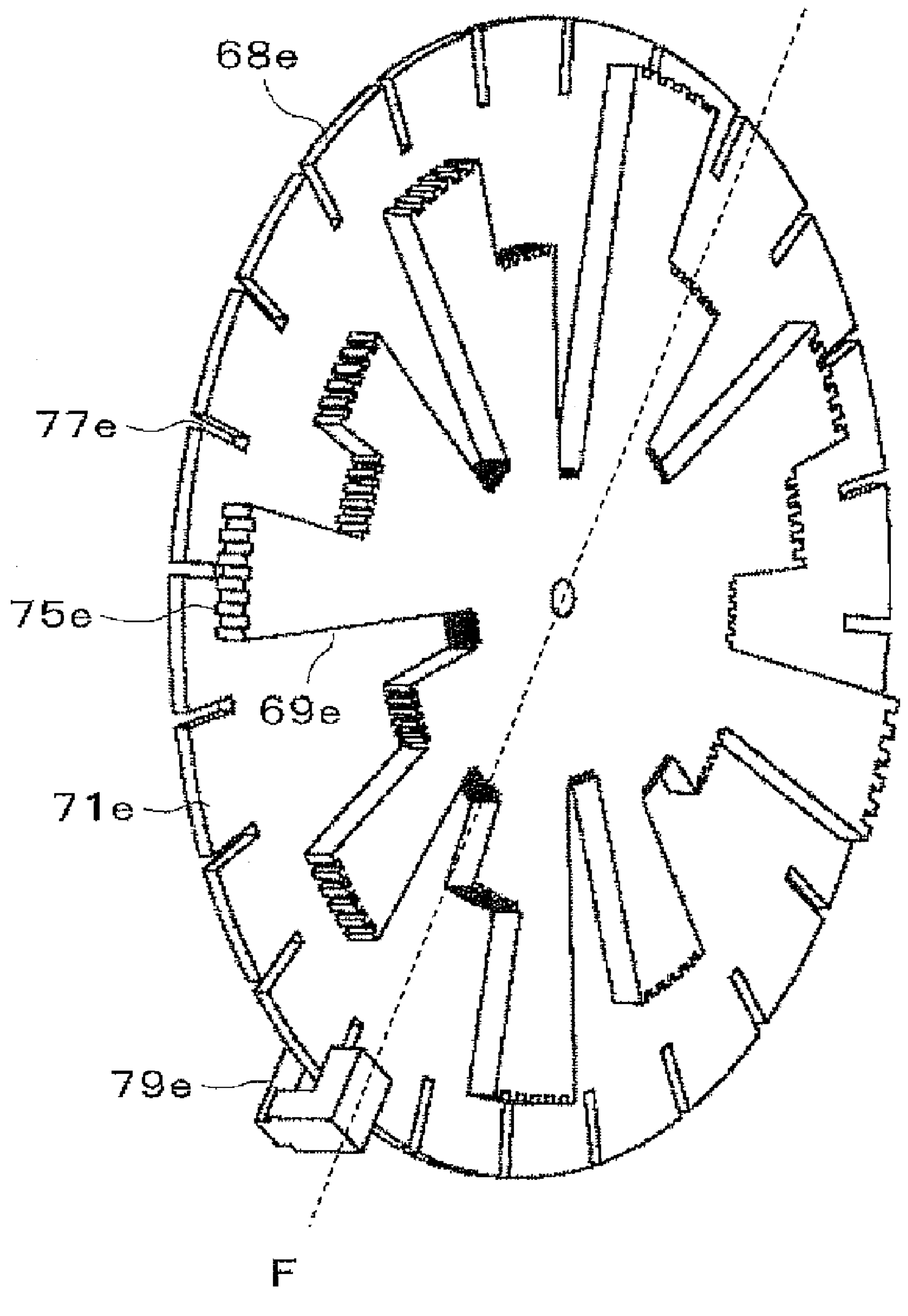
FIG. 17 is an oblique view of the sensor and the disk according to Embodiment 5.
Figure 18:
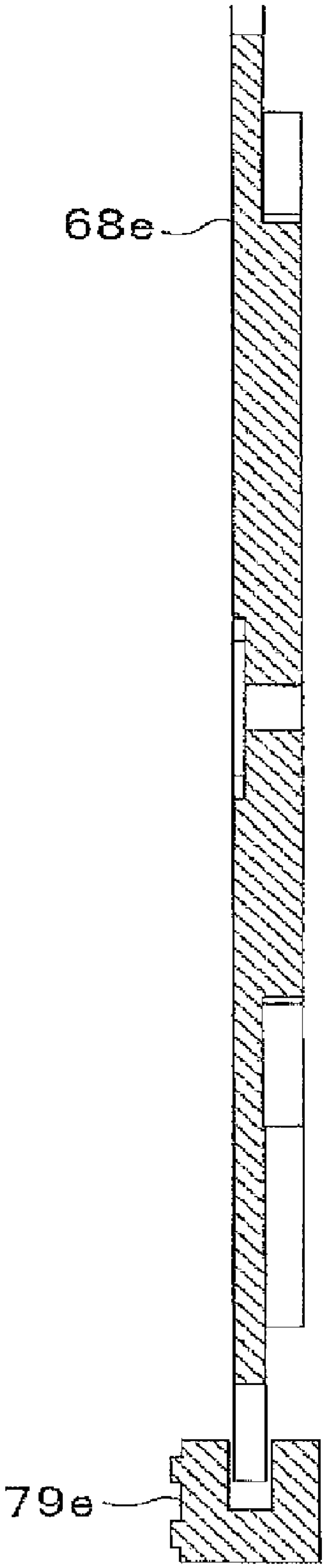
FIG. 18 is a cross section of the sensor and the disk according to Embodiment 5.
Figure 19:
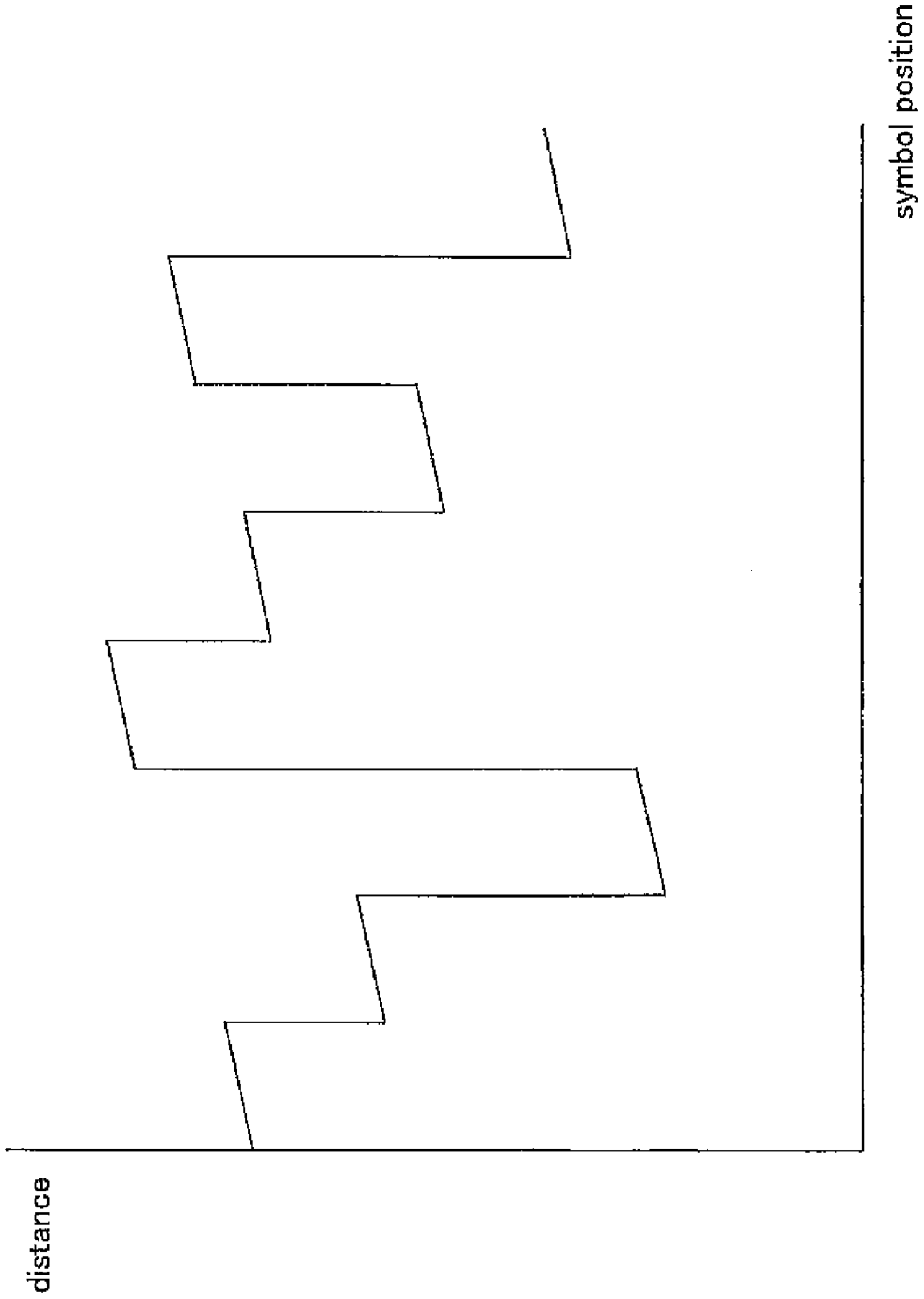
FIG. 19 is a diagram illustrating the correspondence between the distance from the detection surface to the distance sensor and the symbol position on the reel according to Embodiment 6.

In addition, in Embodiment 4, it is determined that the center of the symbol is displayed in the middle region of the symbol display region 8 from the fact that the distance between the rotational axis and the center part 76*d* of the detection surface 75*d* is within a range unique to each center part, but as shown in FIG. 17, notches 77*e* may be provided around the peripheral edge of the disk 68*e*, and it may be determined that the center of the symbol is in the middle region of the symbol display region 8 by using a sensor 79*e* to detect the light passing through these notches. The structure of the convex members 69*e* arranged on the disk surface 71*e* is the same as in Embodiment 1. FIG. 18 is a cross section at the position of F shown in FIG. 17. The sensor 79*e* consists of a light emitting component and a light receiving component on either side of the disk. The displayed symbol identifier according to Embodiment 5 comprises the disk 68*e*, the distance sensor 65, the sensor 79*e*, the memory component 81, the symbol identifier 82, and the center determination component 83.

As a result, it can be determined whether or not the displayed symbol has stopped in the middle region of the symbol display region 8. In addition, when the rotating reel 67 is being stopped, the center of the symbol can be stopped in the middle region of the symbol display region 8 by detecting the notch 77*e* in the disk 68*e*.

Furthermore, holes, rather than the notches 77*e*, may be arranged on the disk 68*e*. In addition, the sensor 79*e* is not limited to an optical sensor, and may instead be a magnetic sensor.

A similar effect is obtained when two disks are stacked, and one disk includes information allowing a determination that the center of a symbol is displayed in the middle region of the symbol display region 8. In addition, a shaft may be used instead of one of the disks.

Embodiment 6

In Embodiment 1, the detection surfaces 75*a* were serrated, but the detection surfaces may also have a shape that steadily moves toward or away from the rotational axis. FIG. 17 is a diagram of the profile in an example of a shape in which the detection surface steadily moves toward or away from the rotational axis.

As a result, a symbol position on the reel 67 can be detected by putting the distance from the rotational axis to the detection surface 75 in a one-to-one correspondence with the symbol position on the reel 67, and detecting the distance to the detection surface 75 with the distance sensor 65 across from that detection surface 75. This means that the disk 68 does not need a reference position, and the current symbol position can be detected as soon as the power is turned on, without having to rotate the reel 67. In this case, the current symbol position on the reel 67 is detected by storing in the memory component data that correlates the distance from the detection surfaces 75 to the distance sensor 65 with symbol positions on the reel 67, and comparing the detected distances with the this data. The detection of the symbol position may also be accomplished with the symbol identifier 82.

In addition, even if the player should move the reel slightly by cheating after a specific symbol that is to be displayed has in fact been displayed, any deviation produced by this cheating can be easily detected. Furthermore, even a minute deviation can be detected quantitatively, allowing the deviation to be remedied.

The detection surfaces may also be in stepped form. In addition, if the position of a stopped symbol deviates from the position where it is supposed to be displayed, this may be remedied by control from the CPU 30.

Any terms of degree used herein, such as “substantially”, “about” and “approximately”, mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2004-012339. The entire disclosure of Japanese Patent Application No. 2004-012339 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disk for identifying individual symbols on a reel displayed in a symbol display region of a mechanical slot machine, the disk comprising:

a circular plate concentric, with the rotational axis of the reel and rotatable around the rotational axis together with the reel; and a plurality of members arranged on a surface of the circular plate and radiating outward from the rotational axis to distances that uniquely vary with the members, each of the members having a detection surface arranged on a corresponding circumferential surface of a radial tip thereof such that the detection surfaces of the members are located at circumferential positions relative to the disk that correspond to respective circumferential positions of the individual symbols on the reel; and a side surface extending in a radial direction between two of the detection surfaces adjacent to each other in a circumferential direction;

the detection surface of each of the members being located at a unique radius relative to locations of the detection surfaces of others of the members such that the detection surfaces of the members provide reference to the individual symbols, the detection surface of each of the members being shaped with a specific pattern in which radial distances of portions of the detection surface from the rotational axis vary in a circumferential direction, and the detection surface of each of the members being configured to reflect ultrasonic or electromagnetic waves received from an external distance sensor in a radial direction such that the external distance sensor detects reflected waves from the detection surface of each of the members while the reel spins about the rotational axis, the detected pattern of the reflected waves corresponding to the specific pattern of the detection surface.

2. A disk for identifying individual symbols on a reel displayed in a symbol display region of a mechanical slot machine, the disk comprising:

a circular plate concentric with the rotational axis of the reel and rotatable around the rotational axis together with the reel; and a plurality of protrusions separately arranged on a surface of the circular plate;

each of the protrusions projecting in the thickness direction of the circular plate at respective distances from the rotational axis, the distances uniquely varying with the protrusions, each of the protrusions having a detection surface arranged on a corresponding circumferential surface thereof such that the detection surfaces of the protrusions are located at circumferential positions relative to the disk that correspond to respective circumferential positions of the individual symbols on the reel, the detection surface of each of the protrusions being located at a unique radius relative to locations of the detection surfaces of others of the protrusions such that the detection surfaces of the protrusions provide reference to the individual symbols, the detection surface of each of the protrusions being shaped with a specific pattern in which radial distances of portions of the detection surface from the rotational axis vary in a circumferential direction, and the detection surface of each of the protrusions being configured to reflect ultrasonic or electromagnetic waves received from an external distance sensor in a radial direction such that the external distance sensor detects reflected waves from the detection surface of each of the protrusions while the reel spins about the rotational axis, the detected pattern of the reflected waves corresponding to the specific pattern of the detection surface.

3. A device for identifying individual symbols on a reel displayed in a symbol display region of a mechanical slot machine, the device comprising:

a plurality of members arranged around the rotational axis of the reel, radiating outward from the rotational axis to distances that uniquely vary with the members, and rotatable around the rotational axis together with the reel, each of the members having:

a detection surface arranged on a corresponding circumferential surface of a radial tip thereof such that the detection surfaces of the members are located at circumferential positions relative to the rotational axis that correspond to respective circumferential positions of the individual symbols on the reel; and a side surface extending in a radial direction separating two of the detection surfaces adjacent to each other in a circumferential directions;

the detection surface of each of the members being located at a unique radius relative to locations of the detection surfaces of others of the members such that the detection surfaces of the members provide reference to the individual symbols, the detection surface of each of the members being shaped with a specific pattern in which radial distances of portions of the detection surface from the rotational axis vary in a circumferential direction, and the detection surface of each of the members being configured to reflect ultrasonic or electromagnetic waves received from an external distance sensor in a radial direction such that the external distance sensor detects reflected waves from the detection surface of each of the members while the reel spins about the rotational axis, the detected pattern of the reflected waves corresponding to the specific pattern of the detection surface.

4. A device for identifying individual symbols on a reel displayed in a symbol display region of a mechanical slot machine, the device comprising:

a circular member arranged around the rotational axis of the reel and rotatable around the rotational axis together with the reel, and the circular member including portions radiating outward from the rotational axis to distances that uniquely vary with the portions, each of the portions having:

a detection surface arranged on a corresponding circumferential surface of a radial tip thereof such that the detection surfaces of the portions are located at circumferential positions relative to the circular member that correspond to respective circumferential positions of the individual symbols on the reel; and a side surface extending in a radial direction separating two of the detection surfaces adjacent to each other in a circumferential direction;

the detection surface of each of the portions being located at a unique radius relative to locations of the detection surfaces of others of the portions such that the detection surfaces of the portions provide reference to the individual symbols, the detection surface of each of the portions being shaped with a specific pattern in which radial distances of portions of the detection surface from the rotational axis vary in a circumferential direction, and the detection surface of each of the portions being configured to reflect ultrasonic or electromagnetic waves received from an external distance sensor in a radial direction such that the external distance sensor detects reflected waves from the detection surface of each of the portions while the reel spins about the rotational axis, the detected pattern of the reflected waves corresponding to the specific pattern of the detection surface.

5. The disk according to claim 2, wherein the protrusions are detachable from the surface of the circular plate and the circular plate further comprises retainers removably holding the protrusions on the surface of the circular plate, and thereby the protrusions are attachable to the surface of the circular plate at radiuses uniquely and discretely varying with the protrusions.

6. The disk according to claim 1, wherein each of the detection surfaces comprises a serrated surface.

7. The disk according to claim 1, wherein each of the detection surfaces comprises a depression or a projection at a center portion thereof, the depression or projection having a circumferential surface located at a radius different from a radius of the other portions of the same detection surface.

8. A disk for identifying individual symbols on a reel displayed in a symbol display region of a mechanical slot machine, the disk comprising:

a circular plate concentric with the rotational, axis of the reel and rotatable around the rotational axis together with the reel including a hole or notch at each circumferential position corresponding to the circumferential position of the center of a symbol, the hole or notch allowing light or magnetism to pass therethrough in order to ascertain whether or not the center of the symbol is in the middle of the symbol display region; and a plurality of members arranged on a surface of the circular plate and radiating outward from the rotational axis to distances that uniquely vary with the members, each of the members having a detection surface arranged on a corresponding circumferential surface of a radial tip thereof and configured to reflect ultrasonic or electromagnetic waves received from an external distance sensor in a radial direction, and a side surface extending in a radial direction between two of the detection surfaces adjacent to each other in the circumferential direction.

9. The disk according to claim 1, wherein each detection surface has a shape that gradually changes distances from the rotational axis in the circumferential direction.

10. The disk according to claim 1, wherein the circular plate and the members are configured to have a center of gravity located at the rotational axis.

11. A displayed symbol identifier of a mechanical slot machine that serves to successively identify individual symbols on a reel displayed in a symbol display region, comprising:

a disk for identifying individual symbols on a reel displayed in a symbol display region of a mechanical slot machine, the disk having:

a circular plate concentric with the rotational axis of the reel and rotatable around the rotational axis together with the reel;

a plurality of members arranged on a surface of the circular plate and radiating outward from the rotational axis to distances that uniquely vary with the members, each of the members a detection surface arranged on a corresponding circumferential surface of a radial lip thereof such that the detection surfaces of the members are located at circumferential positions relative to the disk that correspond to respective circumferential positions of the individual symbols on the reel; and a side surface extending in a radial direction between two of the detection surfaces adjacent to each other in a circumferential direction;

the detection surface of each of the members being located at a unique radius relative to locations of the detection surfaces of others of the members such that the detection surfaces of the members provide reference to the individual symbols, the detection surface of each of the members being shaped with a specific pattern in which radial distances of portions of the detection surface from the rotational axis vary in a circumferential direction, and the detection surface of each of the members being configured to reflect ultrasonic or electromagnetic waves received from an external distance sensor in a radial direction such that the external distance sensor detects reflected waves from the detection surface of each of the members while the reel spins about the rotational axis, the detected pattern of the reflected waves corresponding to the specific pattern of the detection surface;

a distance sensor for successively irradiating the detection surfaces of the members of the disk with ultrasonic or electromagnetic waves in a radial direction relative to the disk, while the disk and reel spin about the rotational axis, detecting the waves reflected from the detection surface of each of the members in the radial direction, and measuring distances to individual portions of the detection surface in the radial direction on the basis of the detected waves;

a memory for storing first data that represents the correspondence between the distances of the detection surfaces of the members from the distance sensor in the radial direction and the symbols, the memory also for storing data about a profile corresponding to the detection surface of each of the members that represents the specific pattern of the detection surface in which radial distances from the rotational axis vary in the circumferential direction relative to the disk; and a symbol identifier for identifying symbols by retrieving symbols from the first data, the symbols corresponding to the distances from the detection surfaces to the distance sensor in the radial direction detected by the distance sensor, the symbol identifier for detecting the current position of one of the individual symbols on the reel by comparing a circumferential chance in the radial distances from the shaped portions of one of the detection surfaces to the distance sensor with the profile corresponding to each of the detection surfaces.

12. A displayed symbol identifier of a mechanical slot machine which serves to successively identify individual symbols on a reel displayed in a symbol display region, comprising:

a disk for identifying individual symbols on a reel displayed in a symbol display region of a mechanical slot machine, the disk having:

a circular plate concentric with the rotational axis of the reel and rotatable around the rotational axis together with the reel;

a plurality of members arranged on a surface of the circular plate and radiating outward from the rotational axis to distances that uniquely vary with the members, each of the members having a detection surface arranged on a corresponding circumferential surface of a radical tip thereof such that the detection surfaces of the members are located at circumferential positions relative to the disk that correspond to respective circumferential positions of the individual symbols on the reel; and a side surface extending in a radial direction between two of the detection surfaces adjacent to each other in a circumferential direction;

the detection surface of each of the members being located at a unique radius relative to locations of the detection surfaces of others of the members such that the detection surfaces of the members provide reference to the individual symbols, the detection surface of each of the members being shaped with a specific pattern in which radial distances of portions of the detection surface from the rotational axis vary in a circumferential direction, and the detection surface of each of the members being, configured to reflect ultrasonic or electromagnetic waves received from an external distance sensor in a radial direction such that the external distance sensor detects reflected waves from the detection surface of each of the members while the reel spins about the rotational axis, the detected pattern of the reflected waves corresponding to the specific pattern of the detection surface;

each of the detection surfaces comprises a depression or a projection at a center portion thereof, the depression or projection having a circumferential surface located at a radius different from a radius of the other portions of the same detection surface;

a distance sensor for successively irradiating the detection surfaces of the members of the disk with ultrasonic or electromagnetic waves in a radial direction relative to the disk with the disk and while the reel spins about the rotational axis, detecting the waves reflected from the detection surface of each of the members, and measuring distances to portions of the detection surface in the radial direction on the basis of the detected waves;

a memory for storing first data that represents the correspondence between the distances of the detection surfaces of the members from the distance sensor in the radial direction and the symbols, the memory also for storing second data that lists the distances of the center portions of the detection surfaces from the distance sensor in the radial direction;

a symbol identifier for identifying symbols by retrieving symbols from the first data, the symbols corresponding to the distances from the detection surfaces to the distance sensor in the radial direction detected by the distance sensor; and a center determination unit for determining whether or not the center of a symbol is in the middle region of the symbol display region by retrieving a distance from a corresponding detection surface to the distance sensor in the radial direction detected by the distance sensor from the second data.

13. A displayed symbol identifier of a mechanical slot machine which serves to successively identifying individual symbols on a reel displayed in a symbol display region, comprising:

a disk for identifying individual symbols on a reel displayed in a symbol display region of a mechanical slot machine, the disk having:

a circular plate concentric with the rotational axis of the reel and rotatable around the rotational axis together with the reel including a hole or notch at each circumferential position corresponding to the circumferential position of the center of a symbol, the hole or notch allowing light or magnetism to pass therethrough in order to ascertain whether or not the center of the symbol is in the middle of the symbol display region; and a plurality of members arranged on a surface of the circular plate and radiating outward from the rotational axis to distances that uniquely vary with the members, each of the members having a detection surface arranged on a corresponding circumferential surface of a radial tip thereof and configured to reflect ultrasonic or electromagnetic waves received from an external distance sensor in a radial direction, and a side surface extending in a radial direction between two of the detection surfaces adjacent to each other in the circumferential direction;

a distance sensor for successively irradiating the detection surfaces of the members of the disk with ultrasonic or electromagnetic waves, detecting the waves reflected from the detection surfaces, and measuring the distance to the detection surfaces in a radial direction relative to the disk on the basis of the detected waves;

a memory for storing first data that represents the correspondence between the distances from the detection surfaces to the distance sensor in the radial direction and the symbols;

a symbol identifier for identifying symbols by retrieving symbols from the first data, the symbols corresponding to the distances from the detection surfaces to the distance sensor in the radial direction detected by the distance sensor;

a sensor for successively detecting light or magnetism passing through the hole or notch provided in the disk; and a center determination unit for determining whether or not the center of a symbol is in the middle region of the symbol display region by detection of the light or magnetism passing through the hole or notch.

14. A mechanical slot machine, comprising the displayed symbol identifier according to claim 11.

15. A disk for identifying individual symbols on a reel displayed in a symbol display region of a mechanical slot machine, the disk comprising:

a circular plate concentric with the rotational axis of the reel and rotatable around the rotational axis together with the reel, including a hole or notch at each circumferential position corresponding to the circumferential position of the center of a symbol, the hole or notch allowing light or magnetism to pass therethrough in order to ascertain whether or not the center of the symbol is in the middle of the symbol display region; and a plurality of protrusions separately arranged on a surface of the circular plate and each of the protrusions projecting in the thickness direction of the circular plate at respective distances from the rotational axis, the distances uniquely varying with the protrusions, each of the protrusions having a detection surface arranged on a circumferential surface thereof, configured to reflect ultrasonic or electromagnetic waves received from an external distance sensor in a radial direction, the detection surface of each of the protrusions being located at a unique radius relative to locations of the detection surfaces of others of the protrusions such that the detection surfaces of the protrusions provide reference to the individual symbols, the detection surface of each of the protrusions being shaped with a specific pattern in which radial distances of portions of the detection surface from the rotational axis vary in a circumferential direction, and the detection surface of each of the protrusions being configured to reflect ultrasonic or electromagnetic waves received from an external distance sensor in a radial direction such that the external distance sensor detects reflected waves from the detection surface of each of the protrusions while the reel spins about the rotational axis, the detected pattern of the reflected waves corresponding to the specific pattern of the detection surface.

16. A displayed symbol identifier of a mechanical slot machine which serves to successively identifying individual symbols on a reel displayed in a symbol display region, comprising:

a disk for identifying individual symbols on a reel displayed in a symbol display region of a mechanical slot machine, the disk having:

a circular plate concentric with the rotational axis of the reel and rotatable around the rotational axis together with the reel, including a hole or notch at each circumferential position corresponding to the circumferential position of the center of a symbol, the hole or notch allowing light or magnetism to pass therethrough in order to ascertain whether or not the center of the symbol is in the middle of the symbol display region; and a plurality of protrusions separately arranged on a surface of the circular plate and each of the protrusions projecting in the thickness direction, of the circular plate at respective distances from the rotational axis, the distances uniquely varying with the protrusions, each of the protrusions having a detection surface arranged on a circumferential surface thereof, configured to reflect ultrasonic or electromagnetic waves received from an external distance sensor in a radial direction;

a distance sensor for successively irradiating the detection surfaces of the disk with ultrasonic or electromagnetic waves, detecting the waves reflected from the detection surfaces, and measuring the distance to the detection surfaces in the radial direction of the disk on the basis of the detected waves;

a memory for storing first data that represents the correspondence between the distances from the detection surfaces to the distance sensor in the radial direction and the symbols;

a symbol identifier for identifying symbols by retrieving symbols from the first data, the symbols corresponding to the distances from the detection surfaces to the distance sensor in the radial direction detected by the distance sensor;

a sensor for successively detecting light or magnetism passing through the hole or notch provided in the disk; and a center determination unit for determining whether or not the center of a symbol is in the middle region of the symbol display region by detection of the light or magnetism passing through the hole or notch.

* * * * *